(12) United States Patent
Shyr et al.

(10) Patent No.: US 8,880,532 B2
(45) Date of Patent: Nov. 4, 2014

(54) INTERESTINGNESS OF DATA

(75) Inventors: Jing-Yun Shyr, Naperville, IL (US);
Damir Spisic, Chicago, IL (US);
Raymond Wright, Evanston, IL (US);
Jing Xu, Xian (CN); Xueying Zhang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 13/172,707

(22) Filed: Jun. 29, 2011

(65) Prior Publication Data
US 2013/0006998 A1 Jan. 3, 2013

(51) Int. Cl.
*G06F 7/00* (2006.01)
*G06F 17/30* (2006.01)

(52) U.S. Cl.
CPC .............................. *G06F 17/30321* (2013.01)
USPC .......................................... 707/741; 345/440

(58) Field of Classification Search
USPC ........................................................ 707/736
See application file for complete search history.

(56) References Cited

U.S. PATENT DOCUMENTS

| | | | |
|---|---|---|---|
| 5,461,699 A | 10/1995 | Arbabi et al. | |
| 6,466,929 B1 | 10/2002 | Brown et al. | |
| 6,477,534 B1 | 11/2002 | Acharya et al. | |
| 6,812,926 B1 * | 11/2004 | Rugge ............................ | 345/440 |
| 6,813,615 B1 | 11/2004 | Colasanti et al. | |
| 6,976,031 B1 | 12/2005 | Toupal et al. | |
| 7,225,113 B2 | 5/2007 | Rothschild | |
| 7,251,639 B2 * | 7/2007 | Bernhardt et al. .............. | 706/45 |
| 7,493,319 B1 * | 2/2009 | Dash et al. ............................ | 1/1 |
| 7,818,318 B2 | 10/2010 | Berger et al. | |
| 7,978,195 B2 | 7/2011 | Palmer | |
| 8,037,000 B2 | 10/2011 | Delmonico et al. | |
| 2002/0103836 A1 | 8/2002 | Fein et al. | |
| 2002/0161853 A1 | 10/2002 | Burak et al. | |
| 2003/0034995 A1 | 2/2003 | Osborn et al. | |
| 2003/0112234 A1 | 6/2003 | Brown et al. | |
| 2005/0149505 A1 * | 7/2005 | Bossman et al. .................. | 707/3 |
| 2006/0184464 A1 | 8/2006 | Tseng et al. | |
| 2006/0242139 A1 | 10/2006 | Butterfield et al. | |
| 2008/0086436 A1 | 4/2008 | Zhao et al. | |
| 2009/0006438 A1 * | 1/2009 | Tunkelang et al. ........... | 707/101 |
| 2009/0030875 A1 * | 1/2009 | Bossman et al. .................. | 707/2 |
| 2009/0171705 A1 | 7/2009 | Bobak et al. | |

(Continued)

OTHER PUBLICATIONS

Blanchard, J., F. Guillet, and H. Briand, "A User-driven and Quality-oriented Visualization for Mining Association Rules", Proceedings of the Third IEEE International Conference on Data Mining (ICDM'03), © 2003 IEEE, Total 4 pp (Also ICDM 3rd International Conference on, Nov. 19-22, 2003, pp. 493-497).

(Continued)

*Primary Examiner* — Robert Beausoliel, Jr.
*Assistant Examiner* — Michael Pham
(74) *Attorney, Agent, or Firm* — Janaki K. Davda; Konrad, Raynes, Davda & Victor LLP

(57) ABSTRACT

Provided are techniques for analyzing fields. Statistical metrics for each field in a data set are received. A general interestingness index is generated for each field using one or more combination functions that aggregate standardized interestingness sub-indexes. One or more fields are identified as interesting for further analysis using the general interestingness index. One or more expert recommendations for field transformations are constructed for the identified one or more fields.

16 Claims, 27 Drawing Sheets

(56) References Cited

U.S. PATENT DOCUMENTS

| | | | |
|---|---|---|---|
| 2009/0183106 | A1 | 7/2009 | Dotson et al. |
| 2009/0240644 | A1 | 9/2009 | Boettcher et al. |
| 2009/0248489 | A1 | 10/2009 | Moncreiff |
| 2009/0248490 | A1 | 10/2009 | Moncreiff |
| 2009/0287673 | A1* | 11/2009 | Chronister et al. ............... 707/5 |
| 2010/0049538 | A1 | 2/2010 | Frazer et al. |
| 2010/0070382 | A1* | 3/2010 | Inghelbrecht et al. .......... 705/27 |
| 2010/0174670 | A1 | 7/2010 | Malik et al. |
| 2010/0179948 | A1 | 7/2010 | Xie et al. |
| 2010/0235343 | A1 | 9/2010 | Cao et al. |
| 2012/0036103 | A1 | 2/2012 | Stupp et al. |
| 2012/0313947 | A1* | 12/2012 | Rope et al. .................... 345/440 |
| 2013/0007003 | A1 | 1/2013 | Shyr et al. |

OTHER PUBLICATIONS

Hogl, O., M. Muller, H. Stoyan, and W. Stuhlinger, "On Supporting Medical Quality with Intelligent Data Mining", Proceedings of the 34th Hawaii International Conference on System Sciences—2001, © 2001 IEEE, Total 10 pp (Also Proceedings of the 34th Annual Hawaii International Conference on, Jan. 3-6, 2001, pp. 1-10).

Li, Y and Y. LV, "Research on Different Customer Purchase Patterns Based on Subjective Interestingness", 2007 International Conference on Management Science & Engineering (14th), Aug. 20-22, 2007, Total 6 pp (Also ICMSE International Conference on, Aug. 20-22, 2007, pp. 3-8).

Malik, H.H. and J.R. Kender, "High Quality, Efficient Hierarchical Document Clustering using Closed Interesting Itemsets", Proceedings of the Sixth International Conference on Data Mining (ICDM'06), © 2006 IEEE, Total 6 pp (Also ICDM 6th Inter. Conf. on, Dec. 18-22, 2006, pp. 991-996).

Shillabeer, A. and J.F. Roddick, "Reconceptualising Interestingness Metrics for Medical Data Mining", [online]. Retrieved from the Internet at URL: <http://citeseerx.ist.psu.edu/viewdoc/download;jsessionid=5EAE759245971AF2DC5A0AD65C597BF3?doi=10.1.1.90.776&rep=rep1&type=pdf>, 2005, Total 10 pp.

Preliminary Amendment, Sep. 13, 2012, for U.S. Appl. No. 13/614,335, filed Sep. 13, 2012 by J. Shyr et al., Total pp. 6 [57.244C1 (PrelimAmend)].

U.S. Appl. No. 13/614,335, filed Sep. 13, 2011, entitled "Interestingness of Data", invented by Shyr, Jing-Yun, D. Spisic, R. Wright, J. Xu, and X. Zhang, Total 54 pp. [57.244 (Appln)].

Mell, P. and T. Grance, "Effectively and Securely Using the Cloud Computing Paradigm", NIST, Information Technology Laboratory, Oct. 7, 2009, Total 80 pp.

Mell, P. and T. Grance, "The NIST Definition of Cloud Computing (Draft)", National Institute of Standards and Technology, Jan. 2011, Total 7 pp.

U.S. Appl. No. 13/154,594, filed Jun. 7, 2011, with IBM Disclosure No. SVL920110009US1, entitled "Automatic Selection of Different Visualizations for the Organization of Multivariate Data", invented by Wills, G., and Rope, D., (2011), Total 57 pp.

U.S. Appl. No. 13/656,455, filed Oct. 19, 2012, entitled "Interpretation of Statistical Results", invented by, D.J., J. Shyr, M.J. Vais, and M.D. Woods, Total 58 pp. [57.299 (Appln)].

Office Action 1, Apr. 24, 2013, for U.S. Appl. No. 13/656,455, filed Oct. 19, 2012 by D.J. Rope et al., Total 39 pp. [57.299 (OA1)].

Amendment 1, Jan. 15, 2014, for U.S. Appl. No. 13/614,335, filed on Sep. 13, 2012 by J. Shyr et al., Total 7 pp. [Amend1 (57.244C1)].

Amendment 1, Jul. 24, 2013, for U.S. Appl. No. 13/656,455, filed on Oct. 19, 2012 by D.J. Rope et al., Total 12 pp. [Amend1 (57.299)].

Appeal Brief, May 15, 2014, for U.S. Appl. No. 13/656,455, filed on Oct. 19, 2012 by D.J. Rope et al., Total 19 pp. [AplBrf (57.299)].

Final Office Action 1, Mar. 13, 2014, for U.S. Appl. No. 13/614,335, filed on Sep. 13, 2012 by J. Shyr et al., Total 14 pp. [FOA1 (57.244C1)], Jun. 11, 2014.

Final Office Action 1, Oct. 28, 2013, for U.S. Appl. No. 13/656,455, filed on Oct. 19, 2012 by D.J. Rope et al., Total 47 pp. [FOA1 (57.299)].

Notice of Allowance 1, May 14, 2014, for U.S. Appl. No. 13/614,335, filed on Sep. 13, 2012 by J. Shyr et al., Total 11 pp. [NOA1 (57.244C1)].

Notice of Appeal, Feb. 27, 2014, for U.S. Appl. No. 13/656,455, filed on Oct. 19, 2012 by D.J. Rope et al., Total 2 pp. [NtcApl (57.299)].

Notice of Panel Decision, Apr. 17, 2014, for U.S. Appl. No. 13/656,455, filed on Oct. 19, 2012 by D.J. Rope et al., Total 2 pp. [NtcPanelDec (57.299)].

Office Action 1, Oct. 15, 2013, for U.S. Appl. No. 13/614,335, filed on Sep. 13, 2012 by J. Shyr et al., Total 17 pp. [OA1 (57.244C1)].

Pre-Appeal Brief Request for Review, Feb. 27, 2014, for U.S. Appl. No. 13/656,455, filed on Oct. 19, 2012 by D.J. Rope et al., Total 6 pp. [PreAplBrfReq (57.299)].

Response to Final Office Action 1, Apr. 21, 2014, for U.S. Appl. No. 13/614,335, filed on Sep. 13, 2012 by J. Shyr et al., Total 4 pp. [RFOA1 (57244C1)].

Corrected Notice of Allowability, Jun. 20, 2014, for U.S. Appl. No. 13/614,335, filed on Sep. 13, 2013 by J. Shyr et al., Total 7 pp. [57244C1 (CorrNtcAllowability)].

* cited by examiner

600

| # | Main Index | Sub-Index | Description | Comment |
|---|---|---|---|---|
| 1 | Percentage of special values | Missing values | A field with many missing or invalid values may need special treatment (e.g., to impute missing/invalid values, to keep or exclude it from modeling, etc.). Therefore, such fields are paid more attention to. | The main index of percentage of special values is computed by aggregating the special values suggested by the sub-indexes. |
| | | Outliers | Outliers are data points that deviate markedly from the main data points.<br><br>Outliers are useful in many scenarios. For example:<br><br>1. If outliers exist, it means robust statistics or models should be preferred to analyze the data (e.g., using Median instead of Mean to characterize the central tendency).<br><br>2. Outliers are detected and alerted in a safety critical environment, a fraud detection system, an image analysis system, or an intrusion monitoring system. | |
| | | Data glitch | Data glitch may be described as unusually low or high frequency of a bin in contrast with its neighbor bins. It can often reveal interesting things, for example, if the frequency of a bin is unusually high, it may suggest that anomaly values exist, or the field is nearly constant. Armed with this knowledge, users can trim the field more efficiently. | |

FIG. 6A

| 2 | Distribution shape | Asymmetry | The asymmetry of the distribution of a scale field can be measured by the statistic of Skewness. Skewness can come in the form of "negative skewness" or "positive skewness", depending on whether data points are skewed to the left (negative skew) or to the right (positive skew) of the data average.<br><br>Strongly asymmetric distribution of a scale field may often suggest useful things. For example:<br>1. It suggests transforming the variable in order to use statistical inferences that assume variables are symmetrically or even normally distributed.<br>2. If users don't want to transform the variable, they should try to use models that are robust with respect to asymmetric distributions. | In certain embodiments, the index of distribution shape for scale fields is based on the D'Agostino's $K^2$ test.<br><br>In statistics, D'Agostino's $K^2$ test is a goodness-of-fit measure of departure from normality, that is, the test aims to establish whether or not the given sample comes from a normally distributed population. The test is based on transformations of the sample Kurtosis and Skewness, and has power only against the alternatives that the distribution is skewed and/or kurtic. |

| 2 | Distribution shape | Peakedness | Kurtosis is a measure of whether the data are peaked or flat relative to a normal distribution. That is, fields with high kurtosis tend to have a distinct peak near the mean, decline rather rapidly, and have heavy tails. Fields with low kurtosis tend to have a flat top near the mean rather than a sharp peak.<br><br>Strongly high or low Kurtosis is useful in that:<br>1. It suggests transforming the variable in order to use those statistical inferences that assume variables are symmetrically or even normally distributed.<br>2. If users don't want to transform the variable, they should try to use some models that are robust with respect to non-normal distributions. | |
| | | 3. Imbalance | If the distribution of the categories of a categorical field is imbalanced, it is desired to balance the categories. This may help for further analysis of the data (e.g., modeling). | The index of distribution shape for categorical fields is the sub-index of imbalance, which can be evaluated by the following "imbalance coefficient" statistic:<br>$$\frac{fmax - fmin}{N/C}$$ |

| Aspects | Basic statistics |
|---|---|
| Completeness | Missing (including invalid) Value Counts |
| Central tendency | Mean/Median/Interquartile Mean |
| Dispersion | Standard Deviation |
| | Coefficient of Variation (for ratio data and mean >>0 only) |
| | Maximum Value, Minimum Value, Range, Quartiles, Interquartile Range |
| Outlier | Threshold, Number |
| Shape | Skewness |
| | Kurtosis |
| Data glitch | {Position, Frequency} |

FIG. 7

| Aspects | Basic statistics |
|---|---|
| Completeness | Missing (including invalid) Value Counts |
| Center | Mode for Nominal Field; Median for Ordinal Field. |
| Range | Number of categories, Maximum value, Minimum value, Range. |
| Shape | Maximum frequency value, Minimum frequency value, Imbalance coefficient |

FIG. 8

INTERESTINGNESS OF DATA

BACKGROUND

Embodiments of the invention relate to determining the interestingness of data.

When data sources are loaded into a computer for analysis, users often use data analysis tools. The data analysis tools compute various statistics. For many users, there is a basic need to have a comprehensive understanding of the data.

SUMMARY

Provided are a method, computer program product, and system for analyzing fields. Statistical metrics for each field in a data set are received. A general interestingness index is generated for each field using one or more combination functions that aggregate standardized interestingness sub-indexes. One or more fields are identified as interesting for further analysis using the general interestingness index. One or more expert recommendations for field transformations are constructed for the identified one or more fields.

BRIEF DESCRIPTION OF THE SEVERAL VIEWS OF THE DRAWINGS

Referring now to the drawings in which like reference numbers represent corresponding parts throughout:

FIGS. 6A, 6B, and 6C illustrate a table of indexes in accordance with certain embodiments.

FIG. 7 illustrates, in a table, an individual field profile template for a scale field in accordance with certain embodiments.

FIG. 8 illustrates, in a table, an individual field profile template for a categorical field in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
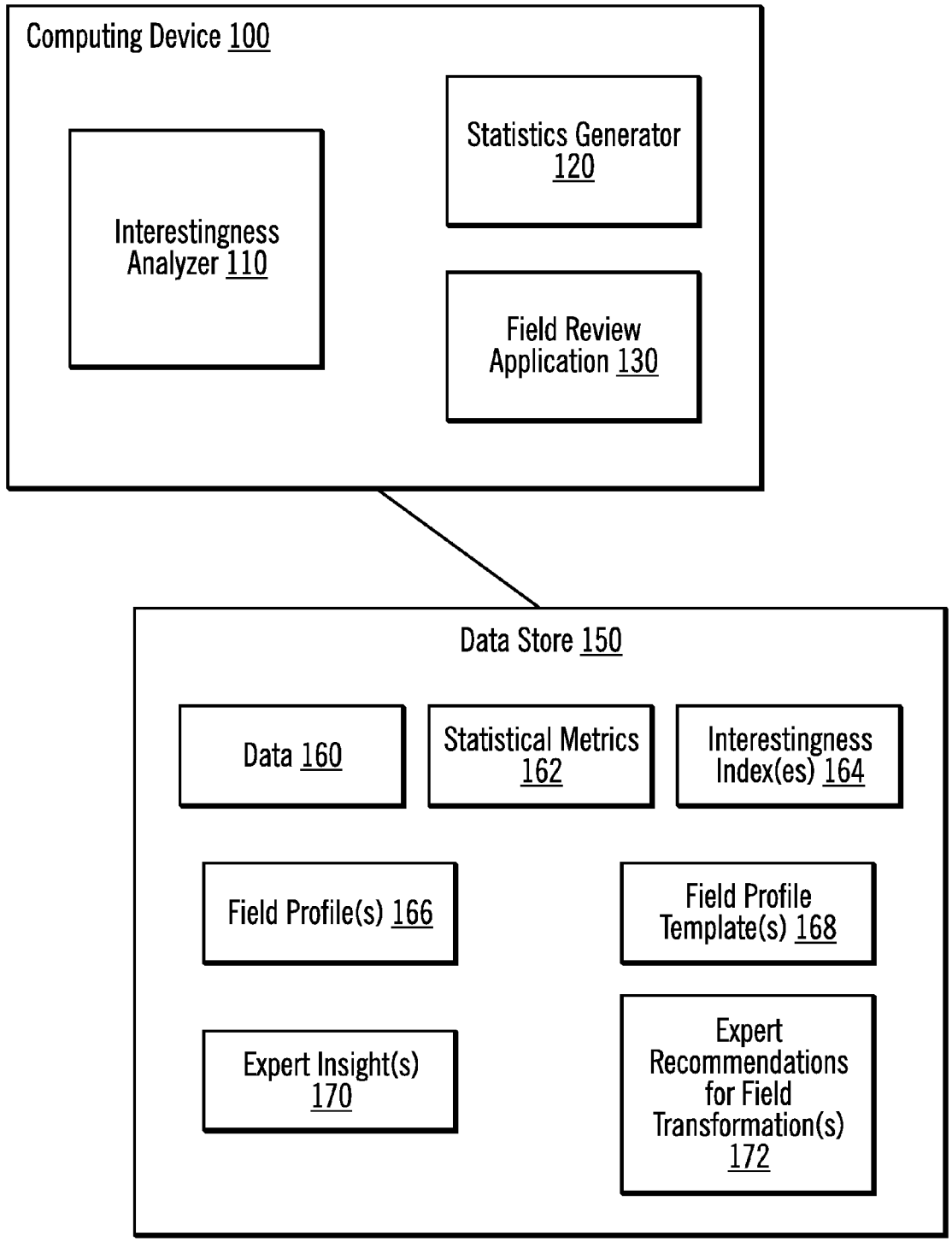
FIG. 1 illustrates, in a block diagram, a computing architecture in accordance with certain embodiments.

FIG. 1 illustrates, in a block diagram, a computing architecture in accordance with certain embodiments. A computing device 100 is coupled to a data store 150. The computing device 100 includes an interestingness analyzer 110, a statistics generator 120 (i.e., a statistical or data mining computation engine), and a field review application 130.

The data store 150 includes data 160 (including fields for analysis), statistical metrics 162, one or more interestingness indexes 164 (also referred to as interestingness metrics), one or more field profiles 166, one or more field profile templates 168, expert insights 170, and expert recommendations for field transformations 172. In certain embodiments, the fields whose interestingness is analyzed are attributes or columns of tables. The interestingness indexes 164 include a General Interestingness Index (GII) and include standardized sub-indexes (also referred to as interestingness scores).

The interestingness analyzer 110 provides interestingness evaluation and interpretation by providing an expert view on summaries and analytics computed by the statistics generator 120. In certain embodiments, the statistics generator 120 may be a statistical or data mining computation engine. Across fields, the interestingness analyzer 110 characterizes field interestingness and provides new indexes for field interestingness based on the values of summary statistics and analyses.

For example, the interestingness analyzer 110 is able to answer the following questions 1. Among all the fields (can be hundreds, or even thousands), which ones are the most unusual or interesting, and should be paid more attention to?

2. For a particular field, what useful insights can be drawn? What action needs to be taken?

For a selected field, the interestingness analyzer 110 defines aspects of interestingness, organizes information for a comprehensive overview, derives expert insights 170, provides data interpretation from the computed summaries based on the expert knowledge, and provides expert recommendations for field transformations 172 for informed decisions on executing appropriate field transformations. In certain embodiments, the expert recommendations 172 may be for field transformation rules.

The interestingness analyzer 110 both controls the underlying statistics generator 120 and receives the user's interactive responses to interpret the analytic results and facilitate further data analysis. In certain embodiments, the analysis may be implemented in a form of rules that translate into worded expert insights 170 (i.e., worded messages or statements) for the users. Worded expert insights 170 may be described as messages or statements providing expert insights 170 and expert recommendations 172 to modify fields that the interestingness analyzer 110 has identified as interesting.

The field review application 130 provides a user interface (UI) to provide expert recommendations 172 generated by the interestingness analyzer 110 and to receive input from the user, which is provided to the interestingness analyzer 110.

Figure 2:
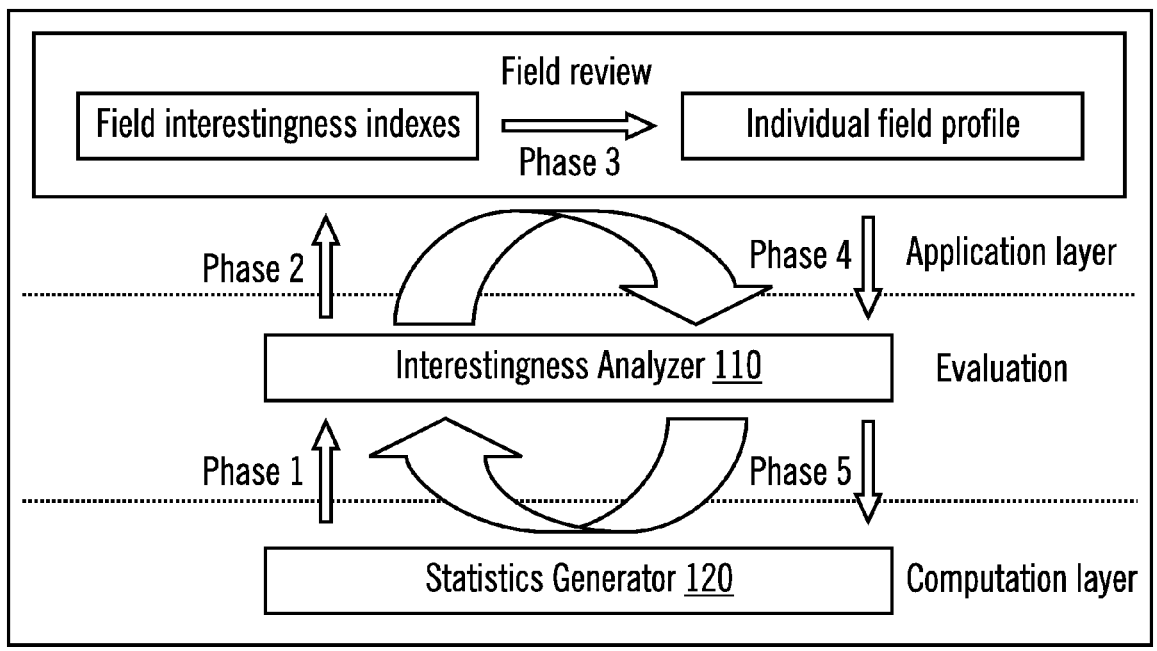
FIG. 2 illustrates, in a block diagram, a framework and flow in accordance with certain embodiments.

FIG. 2 illustrates, in a block diagram, a framework and flow in accordance with certain embodiments. In FIG. 2, embodiments are described with reference to five phases.

Figure 3:
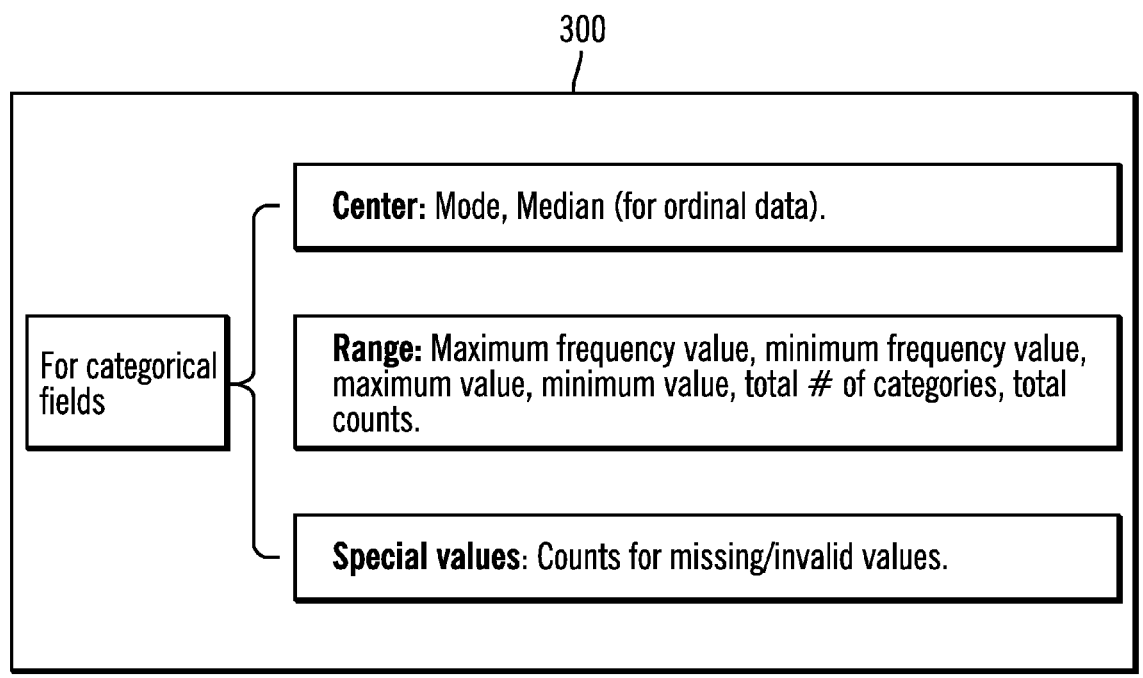
FIG. 3 illustrates statistics for categorical fields in accordance with certain embodiments.
Figure 4:
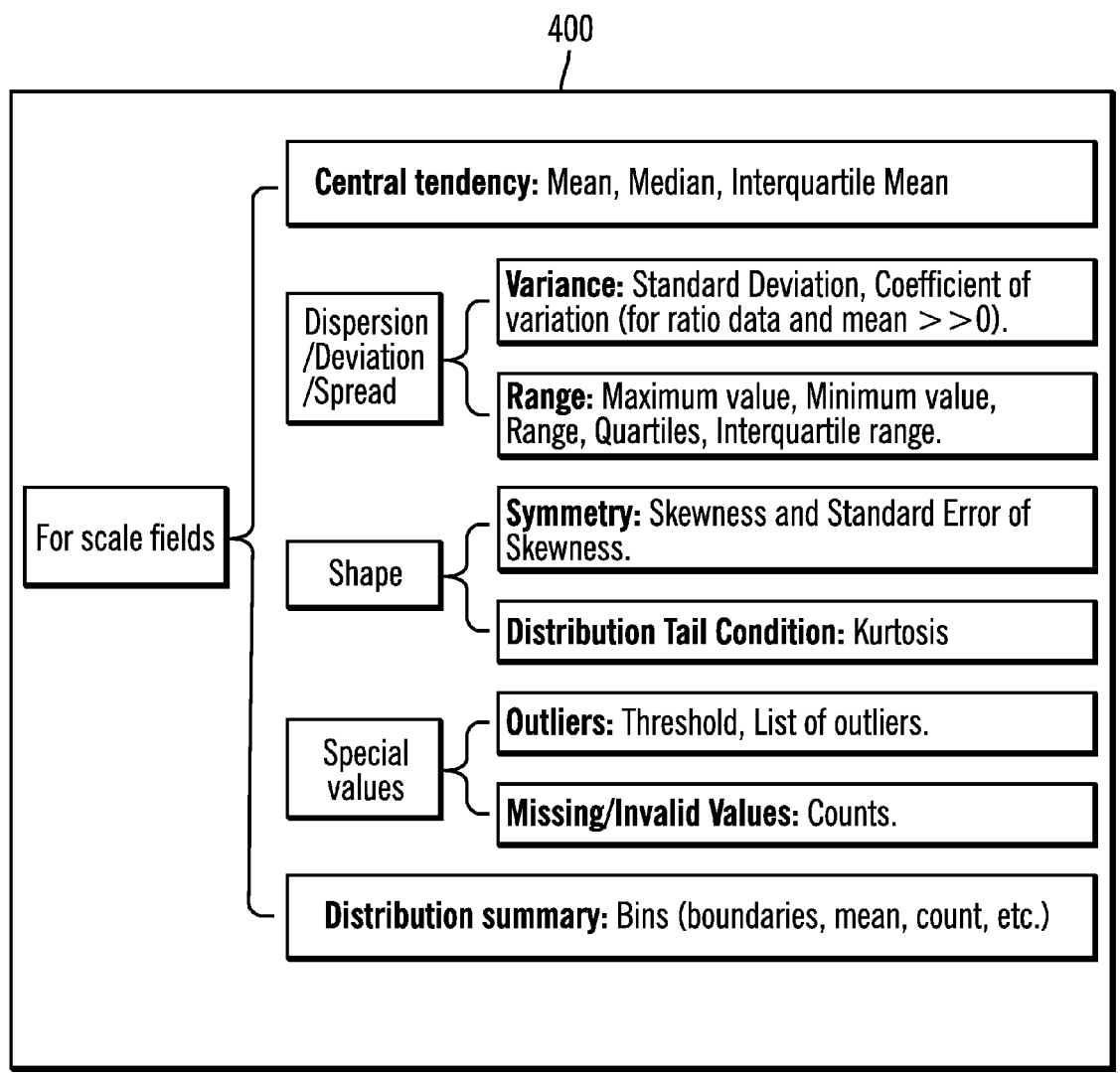
FIG. 4 illustrates statistics for scale fields in accordance with certain embodiments.

In phase 1, the interestingness analyzer 110 takes a set of statistics as inputs from the statistics generator 120. The statistics are computed in the computation layer. FIGS. 3 and 4 illustrate contents of inputs in accordance with certain embodiments. FIGS. 3 and 4 illustrate a set of univariate statistics reflecting aspects of interestingness. In various embodiments different sets of statistics may be used. For example, FIG. 3 illustrates statistics 300 for categorical fields in accordance with certain embodiments. In FIG. 3, for categorical fields, there are center, range, and special values statistics. FIG. 4 illustrates statistics 400 for scale fields in accordance with certain embodiments. In FIG. 4, for scale fields, there are central tendency, dispersion/deviation/spread, shape, special values, and distribution summary statistics. Statistics 300 and 400 are examples of statistical metrics 162.

In phase 2, the interestingness analyzer 110 evaluates the set of statistics and sends evaluation results and worded expert insights 170 for field review in the application layer, together with field interestingness indexes. Based on the input statistics of a field, the interestingness analyzer 110 carries out two tasks: 1) for computation of sorting indexes: the interestingness analyzer 110 computes various interestingness indexes, which are employed for interestingness sorting across all fields; and 2) for interestingness evaluation: the interestingness analyzer 110 evaluates various aspects of interestingness and generates worded expert insights 170 and expert recommendations 172 for field profiles 166.

Figure 5:
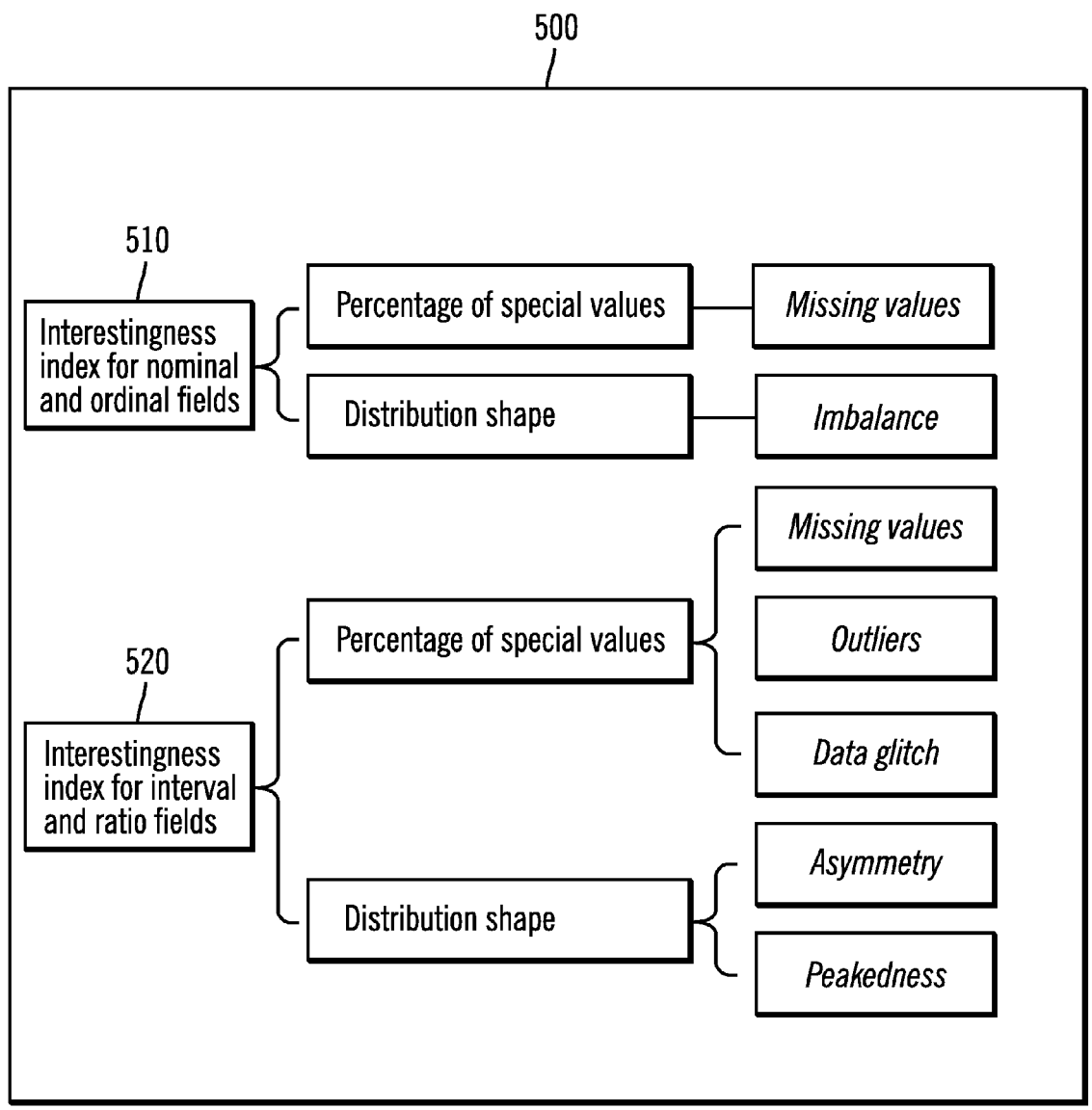
FIG. 5 illustrates General Interestingness Indexes (GII) in accordance with certain embodiments.

The interestingness evaluation supports phase 3. For the computation of sorting indexes, the interestingness indexes available for different field measurement levels are illustrated in FIG. 5, with more details offered in Table 1 of FIGS. 6A, 6B, and 6C in accordance with certain embodiments. FIG. 5 illustrates a General Interestingness Index (GII) 500 in accordance with certain embodiments. GII 500 is an example of a combined interestingness index 164 that includes an interestingness index for nominal and ordinal fields 510 and an interestingness index for interval and ratio fields 520. For the interestingness index for nominal and ordinal fields 510, there are main indexes of percentage of special values (with a sub-index for missing values) and distribution shape (with a sub-index for imbalance). For the interestingness index for interval and ratio fields 520, there are main indexes of percentage of special values (with sub-indexes for missing values, outliers, and data glitch) and distribution shape (with sub-indexes for asymmetry and peakedness.

FIGS. 6A, 6B, and 6C illustrate a table of indexes 600, 610, 620 for indexes of FIG. 5 in accordance with certain embodiments.

Figure 17:
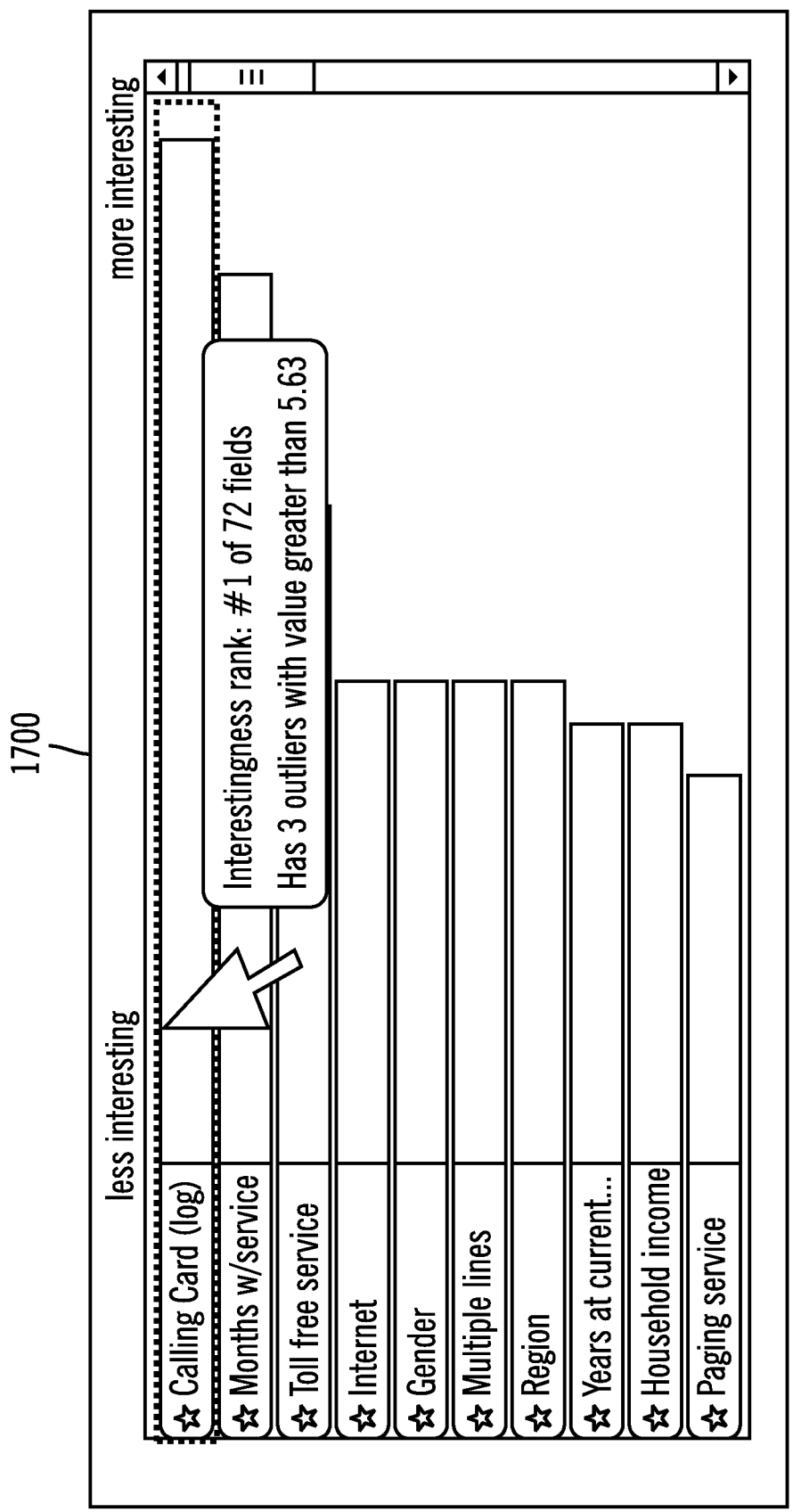
FIG. 17 illustrates sorted fields in accordance with certain embodiments.

The field review application 130 may display the sorted field lists, allowing the user to view relevant fields and expert insights 170 provided by the interestingness analyzer 110. Via the UI provided by the field review application 130, the user may choose a particular index to review the sorted fields. FIG. 17 illustrates sorted fields in accordance with certain embodiments. In particular, FIG. 17 illustrates field sorting according to percentage of special values.

In phase 3, after reviewing the sorted list of fields, the user may zoom in to check individual field profiles 166. Individual field profiles 166 that are prepared by the interestingness analyzer 110 include three parts: 1) statistical metrics 162; 2) expert insights 170; and 3) expert recommendations for field transformations 172. FIG. 7 illustrates, in a table, an individual field profile template 700 for a scale field in accordance with certain embodiments. FIG. 8 illustrates, in a table, an individual field profile template 800 for a categorical field in accordance with certain embodiments. Field profile templates 700, 800 are examples of field profile templates 168.

The interestingness analyzer 110 performs interestingness evaluation. In particular, the interestingness analyzer 110 evaluates various aspects of interestingness and generates worded expert insights 170 and expert recommendations 172 for field profiles. FIGS. 9-16 illustrate, in flow diagrams, logic performed by the interestingness analyzer 110 to generate expert insights 170 and expert recommendations 172 based on the input statistics in accordance with certain embodiments.

Figure 18:
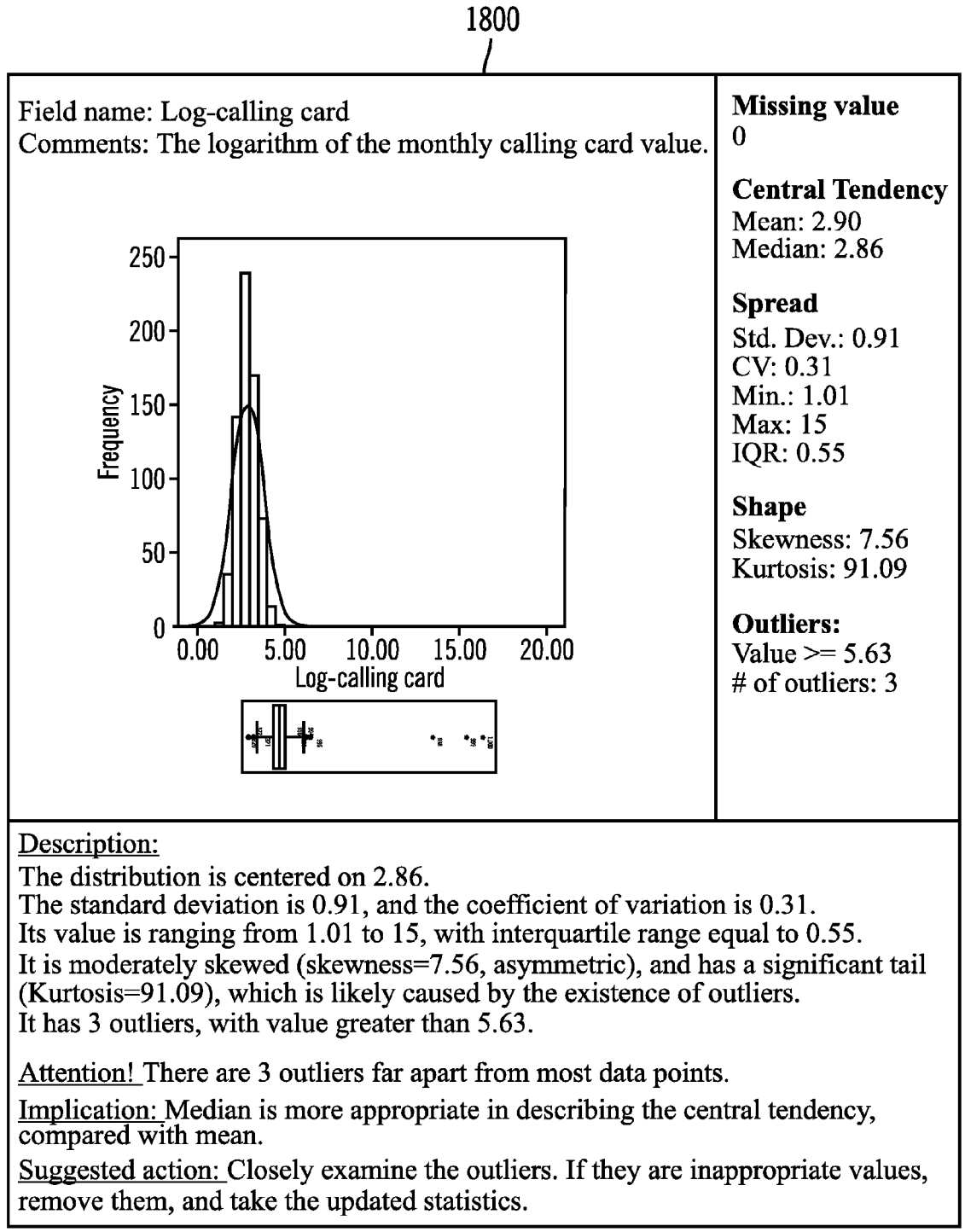
FIG. 18 illustrates a field profile display in a field preview in accordance with certain embodiments.

FIG. 18 illustrates a field profile display in a field preview 1800 in accordance with certain embodiments. In FIG. 18, the field review application 130 displays a graph with frequency versus log-calling card. In FIG. 18, the field review application 130 displays a description with explanations of the graph and expert recommendations 172 provided by the interestingness analyzer 110.

In phase 4, the field review application 130 in the application layer receives field transformation requests from the user to the interestingness analyzer 110. Thus, with the expert insights 170 and expert recommendations 172 provided by the interestingness analyzer 110, the user can make informed decisions on field transformations.

In phase 5, the interestingness analyzer 110 sends the field transformation requests to the statistics generator 120. The statistics generator 120 performs the field transformations (i.e., updates data in the data store 150) and updates the statistics.

Figure 19:
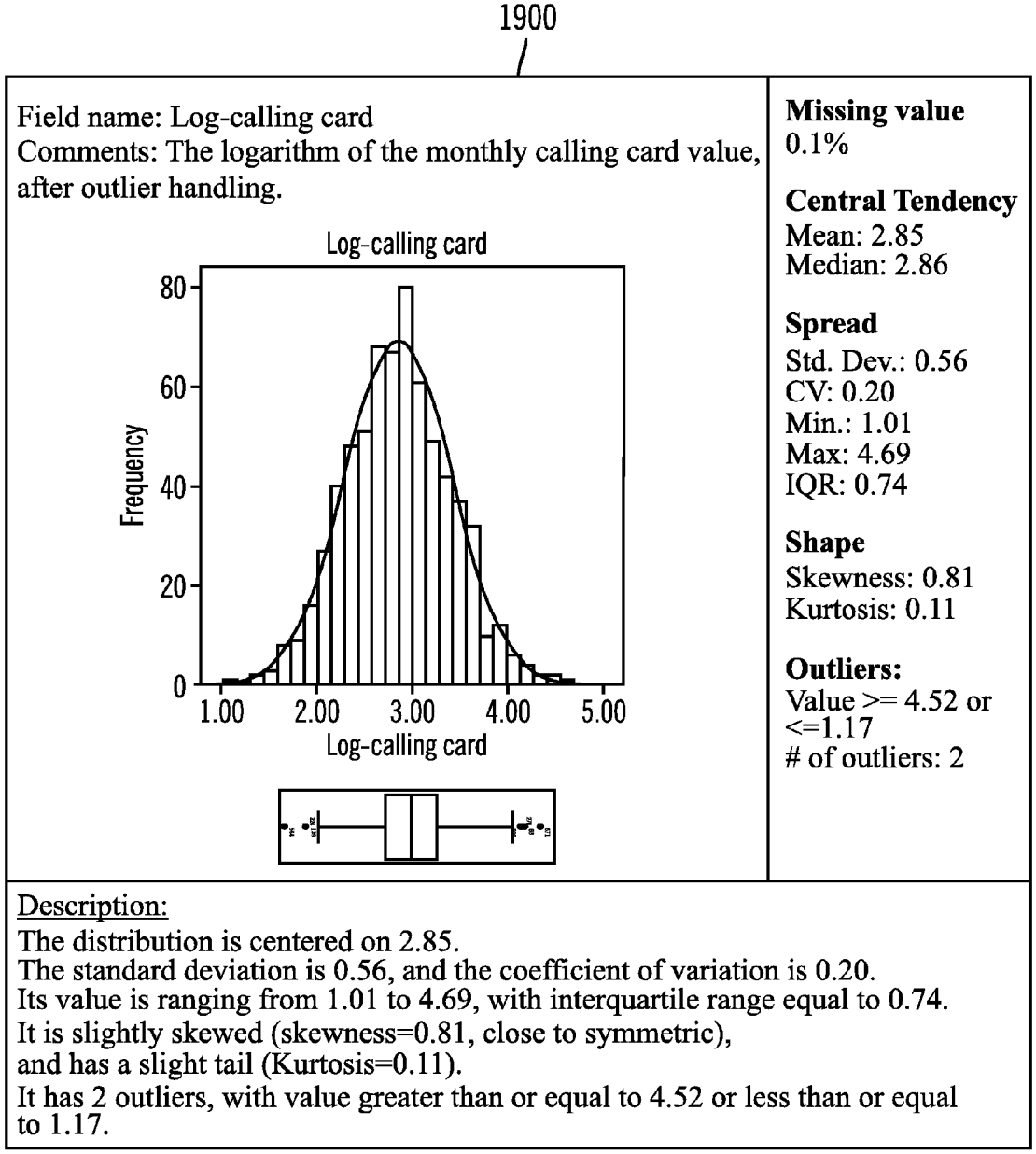
FIG. 19 illustrates a field profile in a field preview after transformation in accordance with certain embodiments.

Then, the statistics generator 120 sends the new, updated statistics to the interestingness analyzer 110. This forms a closed looping process. FIG. 19 illustrates a field profile in a field preview 1900 after transformation in accordance with certain embodiments. In FIG. 19, the field review application 130 displays a revised graph with frequency versus log-calling card. The graph of FIG. 19 is centered (versus the graph of FIG. 18). In FIG. 19, the field review application 130 displays a description with explanations of the graph and expert recommendations 172 provided by the interestingness analyzer 110.

The field profiles displayed in FIGS. 18 and 19 are examples of filed profiles 166.

Figure 9:
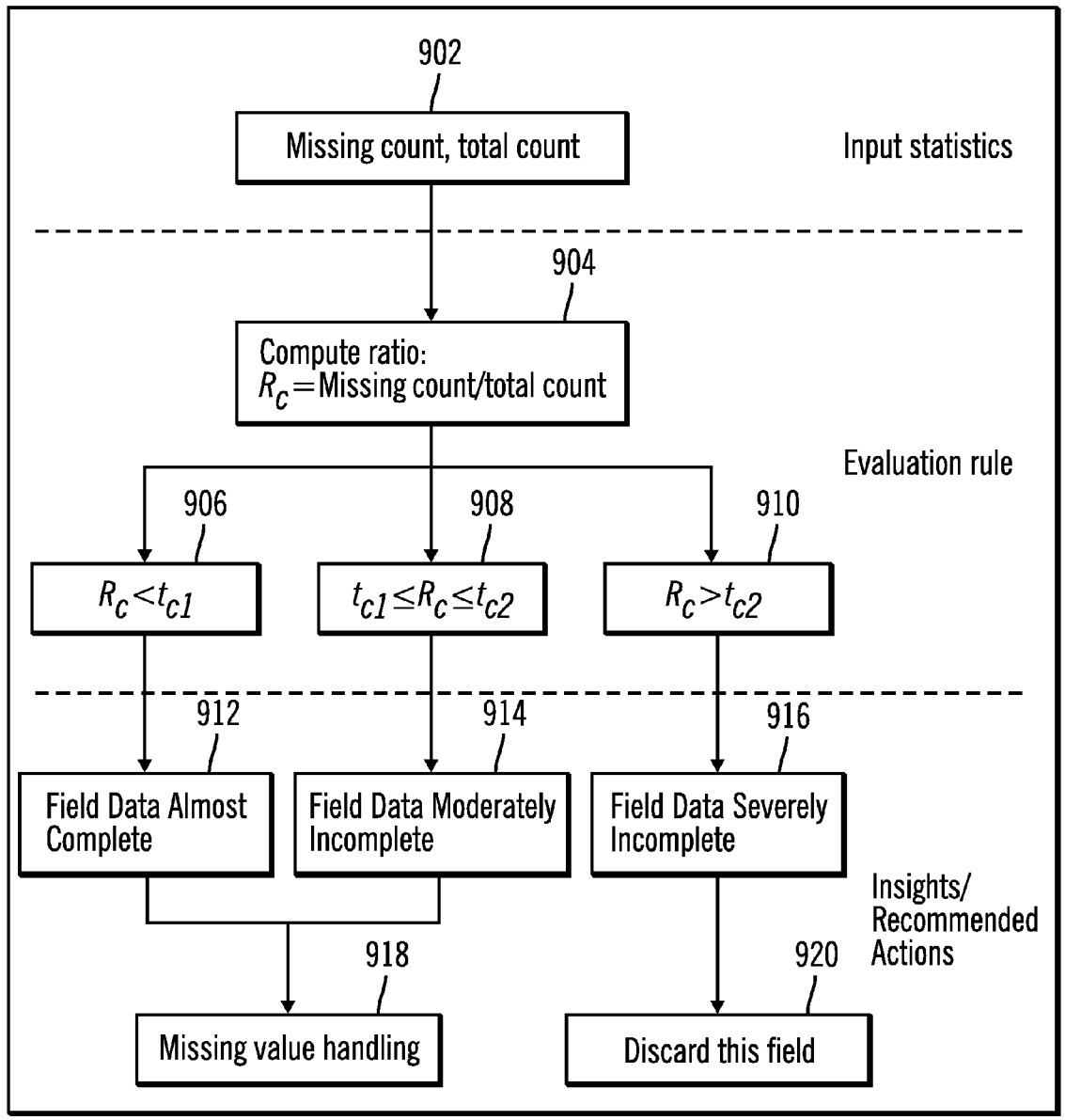
FIG. 9 illustrates, in a flow diagram, logic performed by an interestingness analyzer to generate expert insights and expert recommendations on a completeness aspect for both scale and categorical fields in accordance with certain embodiments.

FIG. 9 illustrates, in a flow diagram, logic performed by the interestingness analyzer 110 to generate expert insights 170 and expert recommendations 172 on a completeness aspect for both scale and categorical fields in accordance with certain embodiments. Control begins at block 902, with the interestingness analyzer 110 receiving input statistics of missing count and total count. In block 904, the interestingness analyzer 110 computes a ratio ($R_c$). Based on how the computed ratio compares with thresholds, the interestingness analyzer 110 continues to block 906, 908, or 910.

In block 906, it is determined that the computed ratio ($R_c$) is less then a first threshold ($t_{c1}$), and, from block 906, processing continues to block 912. In block 912, the interestingness analyzer 110 determines that field data is almost complete. From block 912, processing continues to block 918. In block 918, the interestingness analyzer 110 recommends that the user perform an appropriate missing value handling.

In block 908, it is determined that the computed ratio ($R_c$) is greater than or equal to the first threshold ($t_{c1}$) and less than or equal to a second threshold ($t_{c2}$), and, from block 908, processing continues to block 914. In block 914, the interestingness analyzer 110 determines that field data is moderately incomplete. From block 914, processing continues to block 918.

In block 910, it is determined that the computed ratio ($R_c$) is greater than the second threshold ($t_{c2}$), and, from block 910, processing continues to block 916. In block 916, the interestingness analyzer 110 determines that field data is severely incomplete. From block 916, processing continues to block 920. In block 920, the interestingness analyzer 110 recommends that the user remove a field from further analysis.

Figure 10:
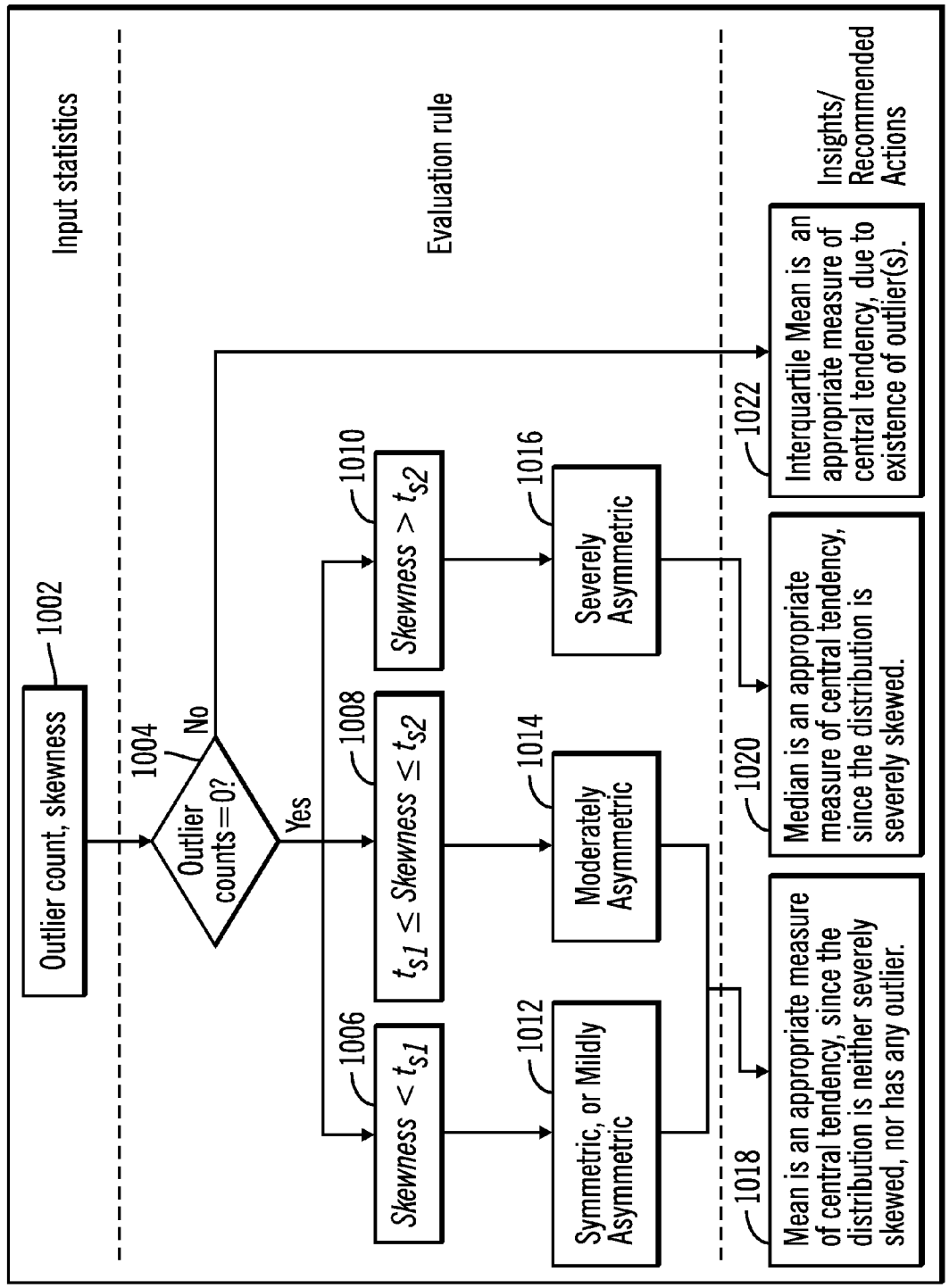
FIG. 10 illustrates, in a flow diagram, logic performed by an interestingness analyzer to generate expert insights and expert recommendations on a central tendency aspect for the scale field in accordance with certain embodiments.

FIG. 10 illustrates, in a flow diagram, logic performed by the interestingness analyzer 110 to generate expert insights 170 and expert recommendations 172 on a central tendency aspect for the scale field in accordance with certain embodiments. Control begins at block 1002 with the interestingness analyzer 110 receiving input statistics of outlier count and skewness. In block 1004, the interestingness analyzer 110 determines whether the outlier count exceeds zero. If so, processing continues to one of blocks 1006, 1008, and 1010, otherwise, processing continues to block 1022.

Based on how the skewness compares with thresholds, the interestingness analyzer 110 continues to block 1006, 1008 or 1010.

In block 1006, it is determined that the skewness is less then a first threshold ($t_{s1}$), and, from block 1006, processing continues to block 1012. In block 1012, the interestingness analyzer 110 determines that the distribution is symmetric or mildly asymmetric. From block 1012, processing continues to block 1018. In block 1018, the interestingness analyzer 110 recommends that the mean is an appropriate measure of central tendency, since the distribution is neither severely skewed nor has any outlier.

In block 1008, it is determined that the skewness is greater than or equal to the first threshold ($t_{s1}$) and less than or equal to a second threshold ($t_{s2}$), and, from block 1008, processing continues to block 1014. In block 1014, the interestingness analyzer 110 determines that the distribution is moderately asymmetric. From block 1014, processing continues to block 1018.

In block 1010, it is determined that the skewness is greater than the second threshold ($t_{s2}$), and, from block 1010, processing continues to block 1016. In block 1016, the interestingness analyzer 110 determines that the distribution is severely asymmetric. From block 1016, processing continues to block 1020. In block 1020, the interestingness analyzer 110 recommends that the median is an appropriate measure of central tendency since the distribution is severely skewed.

In block 1022, the interestingness analyzer 110 recommends that the inter-quartile mean is an appropriate measure of central tendency due to the existence of outliers.

Figure 11:
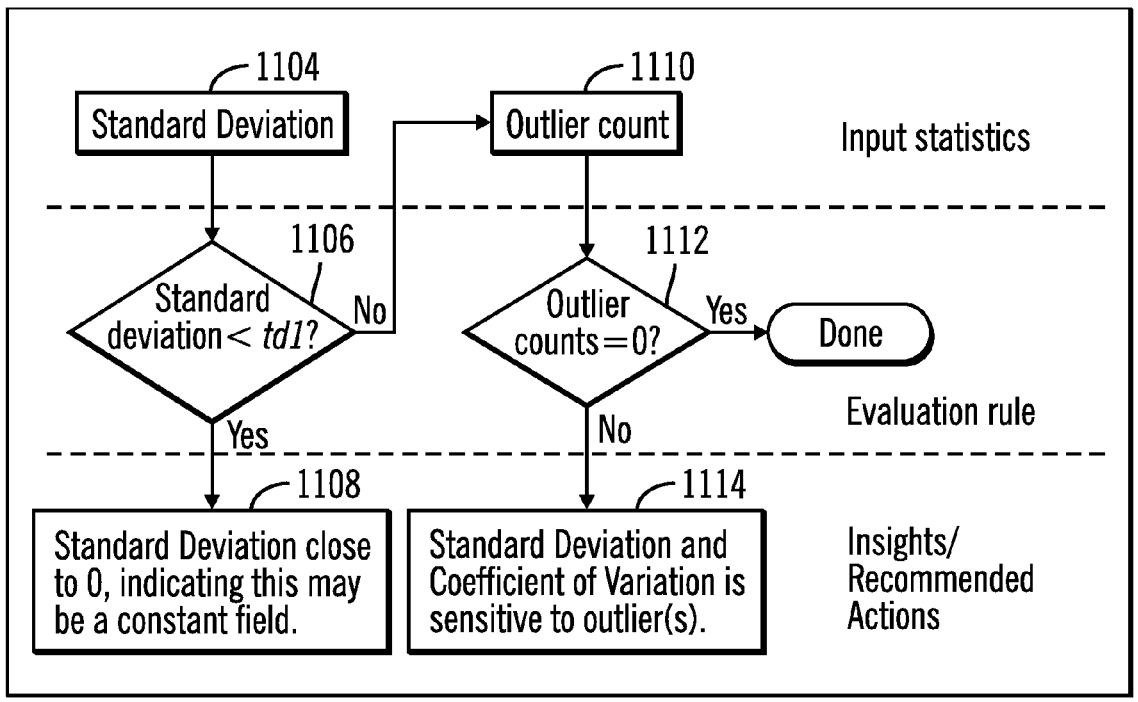
FIG. 11 illustrates, in a flow diagram, logic performed by an interestingness analyzer to generate expert insights and expert recommendations on a dispersion aspect a scale field in accordance with certain embodiments.

FIG. 11 illustrates, in a flow diagram, logic performed by the interestingness analyzer 110 to generate expert insights 170 and expert recommendations 172 on a dispersion aspect a scale field in accordance with certain embodiments. Control begins at block 1104 with the interestingness analyzer 110 receiving an input statistic of standard deviation. In block 1106, the interestingness analyzer 110 determines whether the standard deviation is less than a threshold ($t_{d1}$). If so, processing continues to block 1008, otherwise, processing continues to block 1110. In block 1008, the interestingness analyzer 110 determines that the standard deviation is close to zero, indicating that this may be a constant field.

In block 1110, the interestingness analyzer 110 determines that the input statistic is outlier count. In block 1112, the interestingness analyzer 110 determines whether the outlier count equals zero. If so, processing is done, otherwise, processing continues to block 1014. In block 1014, the interestingness analyzer 110 recommends that the standard deviation and coefficient of variation is sensitive to one or more outliers.

Figure 12:
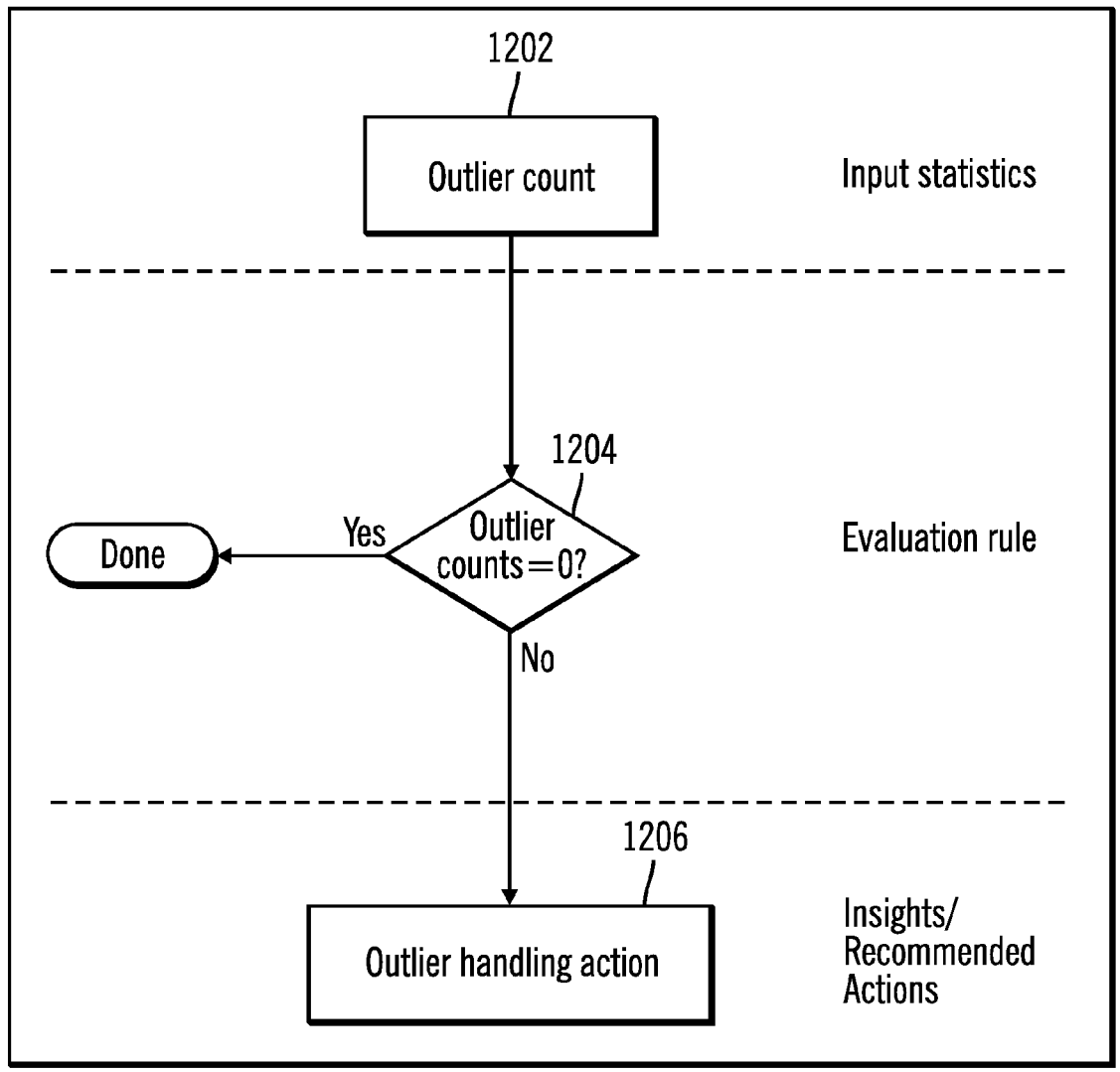
FIG. 12 illustrates, in a flow diagram, logic performed by an interestingness analyzer to generate expert insights and expert recommendations on an outlier aspect for a scale field in accordance with certain embodiments.

FIG. 12 illustrates, in a flow diagram, logic performed by the interestingness analyzer 110 to generate expert insights 170 and expert recommendations 172 on an outlier aspect for a scale field in accordance with certain embodiments. Control begins at block 1202 with the interestingness analyzer 110 receiving an input statistic of outlier count. In block 1204, the interestingness analyzer 110 determines whether the outlier count equals zero. If so, processing is done, otherwise, processing continues to block 1206. In block 1206, the interestingness analyzer 110 recommends outlier handling action.

Figure 13:
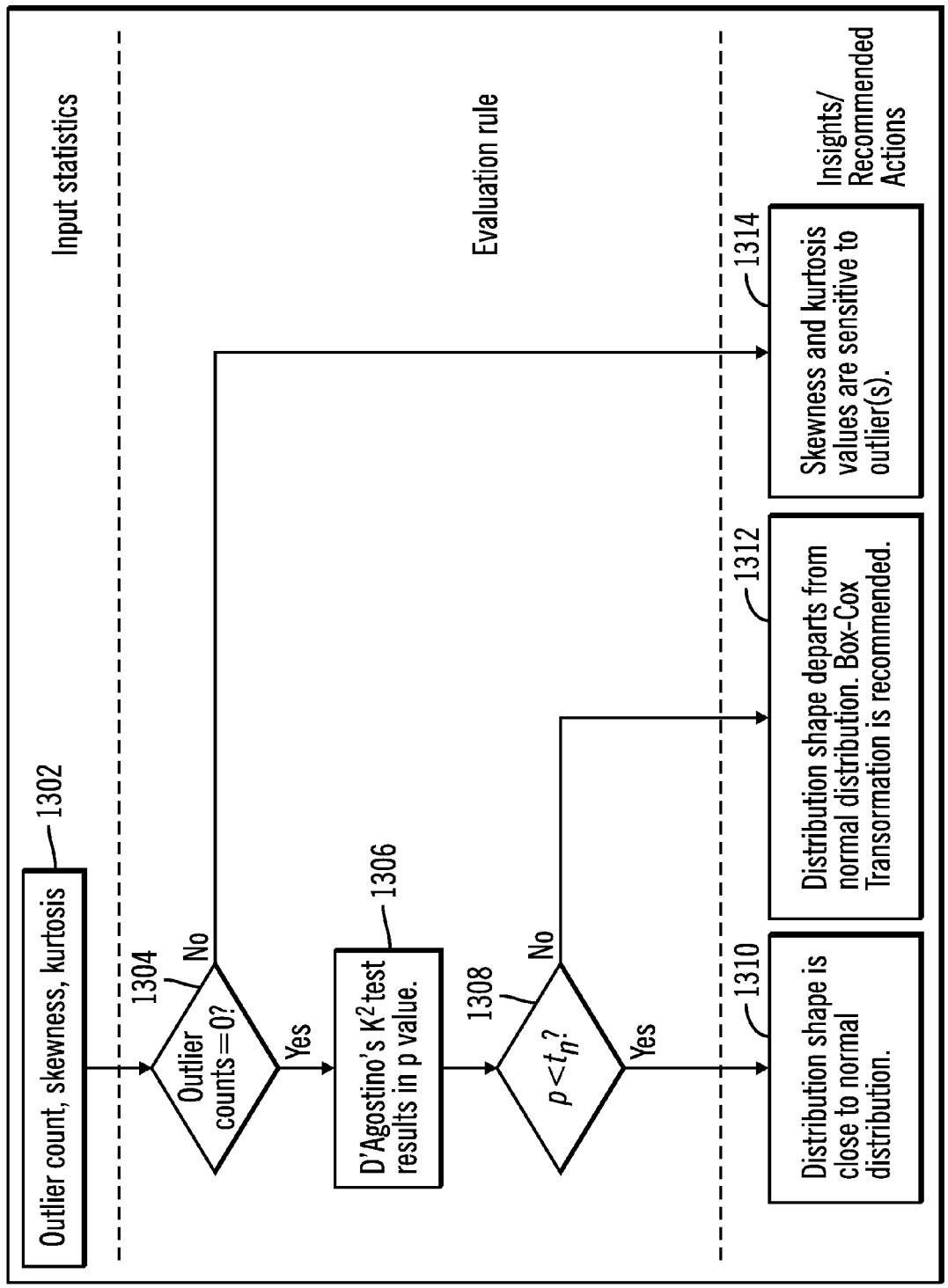
FIG. 13 illustrates, in a flow diagram, logic performed by an interestingness analyzer to generate expert insights and expert recommendations on a distribution shape aspect for a scale field in accordance with certain embodiments.

FIG. 13 illustrates, in a flow diagram, logic performed by the interestingness analyzer 110 to generate expert insights 170 and expert recommendations 172 on a distribution shape aspect for a scale field in accordance with certain embodiments. Control begins at block 1302 with the interestingness analyzer 110 receiving input statistics of outlier count, skewness, and kurtosis. In block 1304, the interestingness analyzer 110 determines whether the outlier count is equal to zero. If so, processing continues to block 1306, otherwise, processing continues to block 1314.

In block 1306, the interestingness analyzer 110 performs the D'Agostino's $K^2$ test, which results in a "p" value. In block 1308, the interestingness analyzer 110 determines whether "p" is less than a threshold ($t_n$). If so, processing continues to block 1310, otherwise, processing continues to block 1312. In block 1310, the interestingness analyzer 110 recommends that the distribution shape is close to normal distribution.

In block 1312, the interestingness analyzer 110 recommends that the distribution shape departs from normal distribution and that a Box-Cox transformation (which is particular way of parameterising a power transform) is recommended.

In block 1314, the interestingness analyzer 110 recommends that the skewness and kurtosis values are sensitive to one or more outliers.

Figure 14:
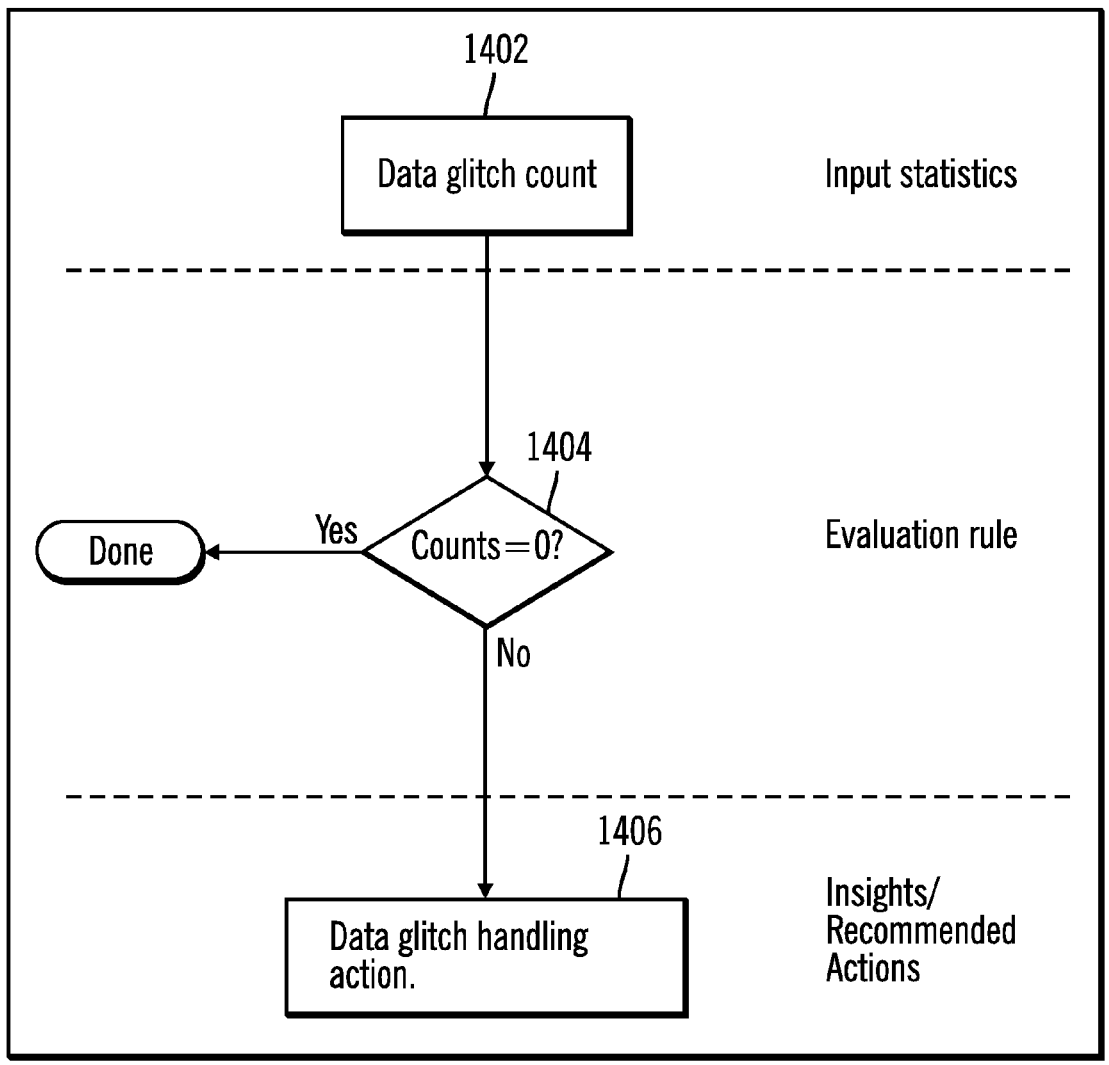
FIG. 14 illustrates, in a flow diagram, logic performed by an interestingness analyzer to generate expert insights and expert recommendations on a data glitch aspect for a scale field in accordance with certain embodiments.

FIG. 14 illustrates, in a flow diagram, logic performed by the interestingness analyzer 110 to generate expert insights 170 and expert recommendations 172 on a data glitch aspect for a scale field in accordance with certain embodiments. Control begins at block 1402 with the interestingness analyzer 110 receiving an input statistic of data glitch count. In block 1404, the interestingness analyzer 110 determines whether the data glitch count equals zero. If so, processing is done, otherwise, processing continues to block 1406. In block 1406, the interestingness analyzer 110 recommends a data glitch handling action.

Figure 15:
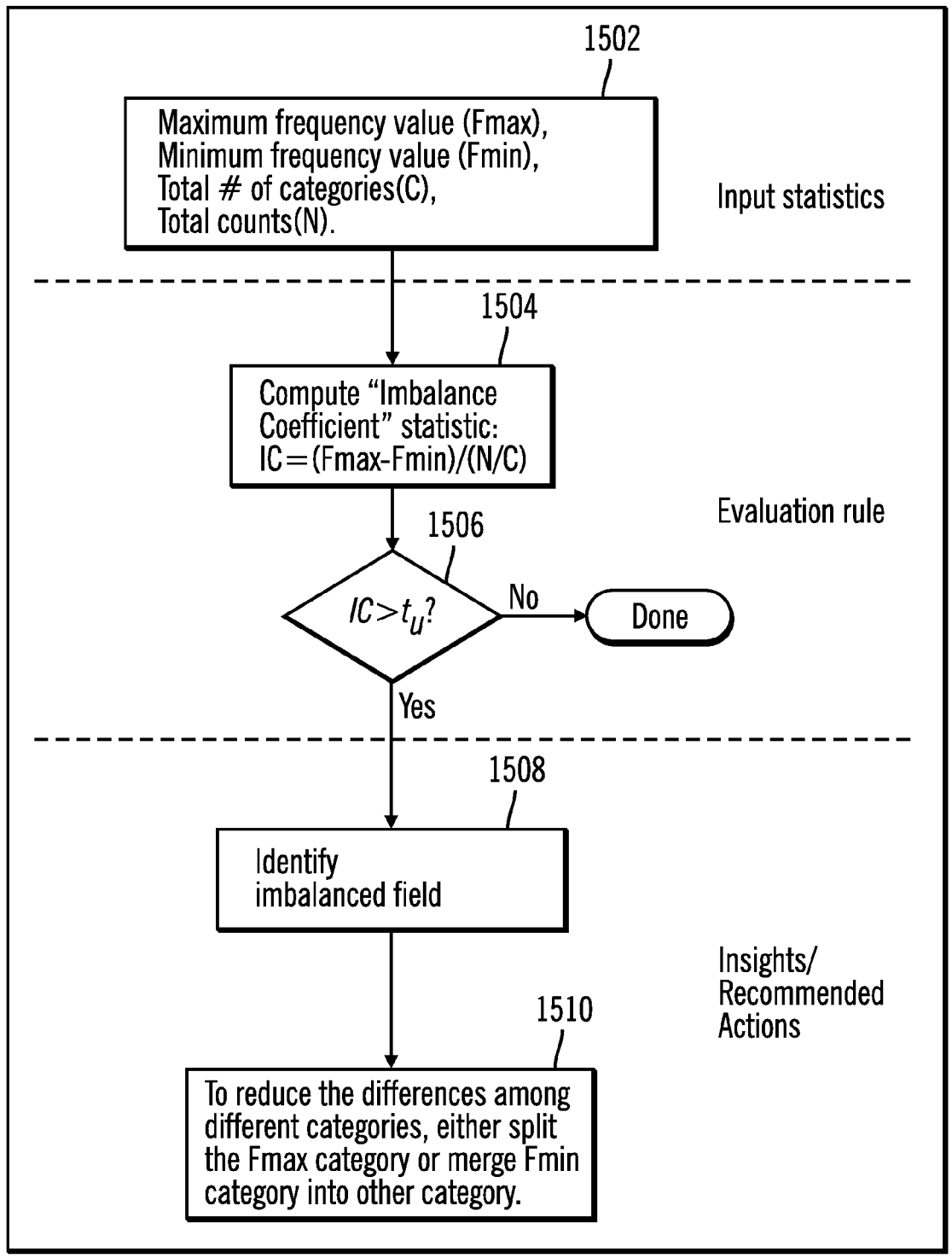
FIG. 15 illustrates, in a flow diagram, logic performed by an interestingness analyzer to generate expert insights and expert recommendations on an imbalance aspect for a categorical field in accordance with certain embodiments.

FIG. 15 illustrates, in a flow diagram, logic performed by the interestingness analyzer 110 to generate expert insights 170 and expert recommendations 172 on an imbalance aspect for a categorical field in accordance with certain embodiments. Control begins at block 1502 with the interestingness analyzer 110 receiving input statistics of a maximum frequency value (Fmax), a minimum frequency value (Fmin), total number (#) of categories (C), and total counts (N). In block 1504, the interestingness analyzer 110 computes an imbalance coefficient statistic: IC=(Fmax−Fmin)/(N/C). In block 1506, the interestingness analyzer 110 determines whether the imbalance coefficient is greater than a threshold ($t_{ic}$). If so, processing continues to block 1508, otherwise, processing is done.

In block 1508, the interestingness analyzer 110 identifies an imbalanced field. In block 1510, the interestingness analyzer 110 recommends, to reduce the difference among different categories, the user can either split the Fmax category or merge one Fmin category into another category.

Figure 16:
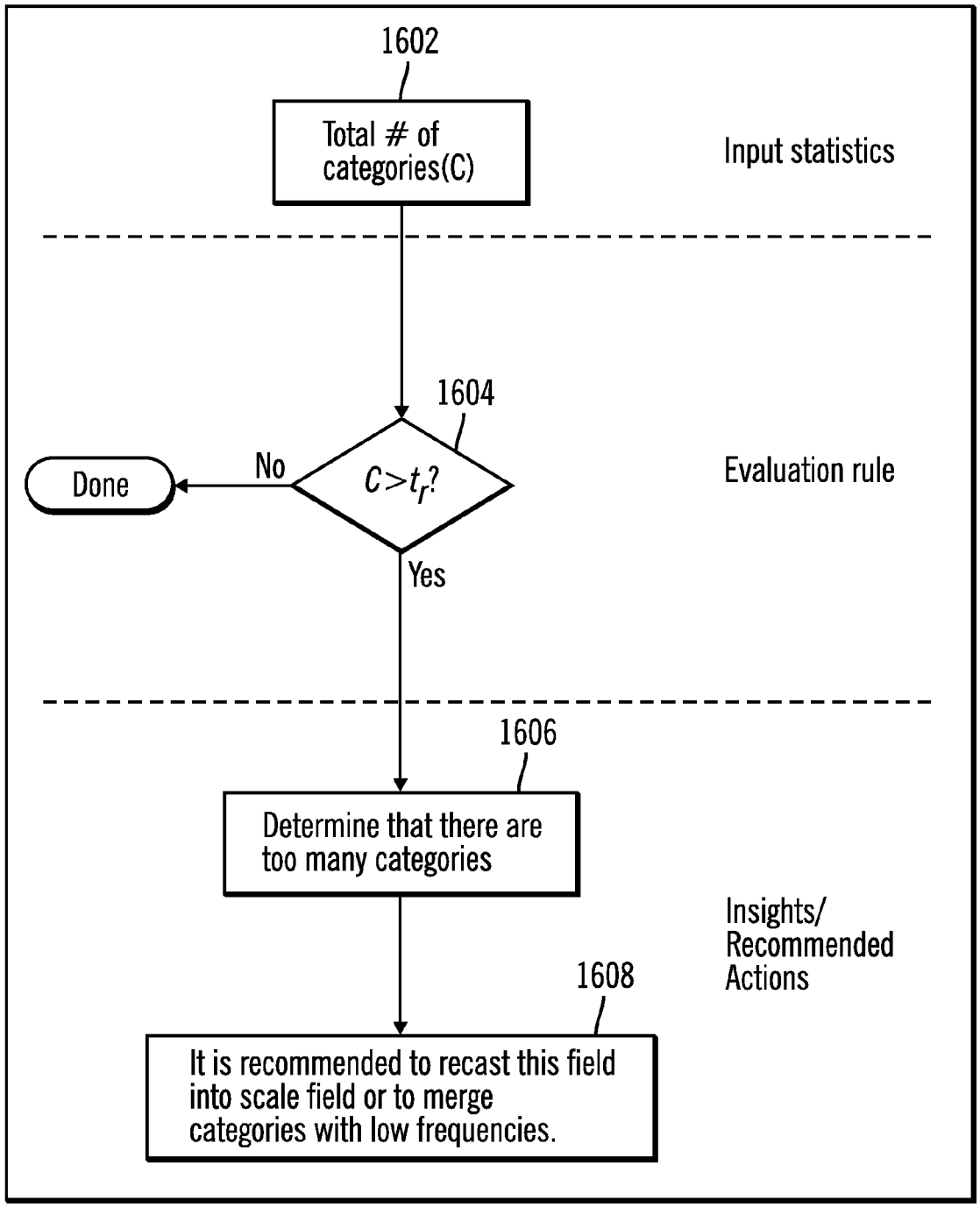
FIG. 16 illustrates, in a flow diagram, logic performed by an interestingness analyzer to generate expert insights and expert recommendations on a range aspect for an ordinal field in accordance with certain embodiments.

FIG. 16 illustrates, in a flow diagram, logic performed by the interestingness analyzer 110 to generate expert insights 170 and expert recommendations 172 on a range aspect for an ordinal field in accordance with certain embodiments. Control begins at block 1602 with the interestingness analyzer 110 receiving input statistics of a total number (#) of categories (C). In bock 1604, the interestingness analyzer 110 determines whether the total number of categories (C) is greater than a threshold ($t_r$). If so, processing continues to 1606, otherwise, processing is done. In block 1606, the interestingness analyzer 110 determines that there are too many categories. In block 1608, the interestingness analyzer 110 recommends that the user recast this field into a scale field or merge categories with low frequencies.

Returning to FIG. 5, the two General Interestingness Indexes (GII) 500, the interestingness index for nominal and ordinal fields 510 and the interestingness index for interval and ratio fields 520, are strongly tied to both sub-indexes and the expert insights 170 and expert recommendations 172 in the field profiling.

The GII 164 is computed as a function of the standardized sub-indexes. The standardized sub-indexes are called interestingness scores for various interestingness dimensions, in Equation 1:

$$\text{GII}=f(u_1(SI_1), \ldots, u_n(SI_n)) \quad \text{Equation 1}$$

where
n is the total number of sub-indexes contributing to the GII, $SI_i$, i=1, ..., n is an $i^{th}$ sub-index, such as an outlier index, $u_i(\cdot)$, i=1, ..., n is the scoring function for the ith sub-index, $f(\cdot)$ is a combination function that aggregates the standardized sub-indexes to form the GII.

Each scoring function $u_i(\cdot)$ maps values of the sub-index $SI_i$ to the interval [0, 1]. A score close to 1 describes a highly interesting index value, while a score approaching 0 describes that the field is normal. For example, a scale field having the skewness score equal to 0.1 indicates that this field is mildly skewed compared to a normal distribution. The interestingness score is more intuitive to non-expert users and better comparable across different dimensions.

The combination function $f(\cdot)$ aggregates the interestingness scores obtained from the scoring function to form the GII 164. Both the inputs and the output have values ranging from 0 to 1. Similarly to the interestingness scores, the value of GII reflects the degree of interestingness.

Both the interestingness scores and the GII are offered in the field profile section to support the expert insights 170 and expert recommendations 172.

In various embodiments, the scoring function $u_i(\cdot)$ may take different forms that each satisfy the following requirements:

1) the scoring function maps a value range of the sub-index (SI) to the interval [0, 1], and
2) the resulting interestingness score reflects the degree of interestingness for the dimension under consideration.

Figure 20:
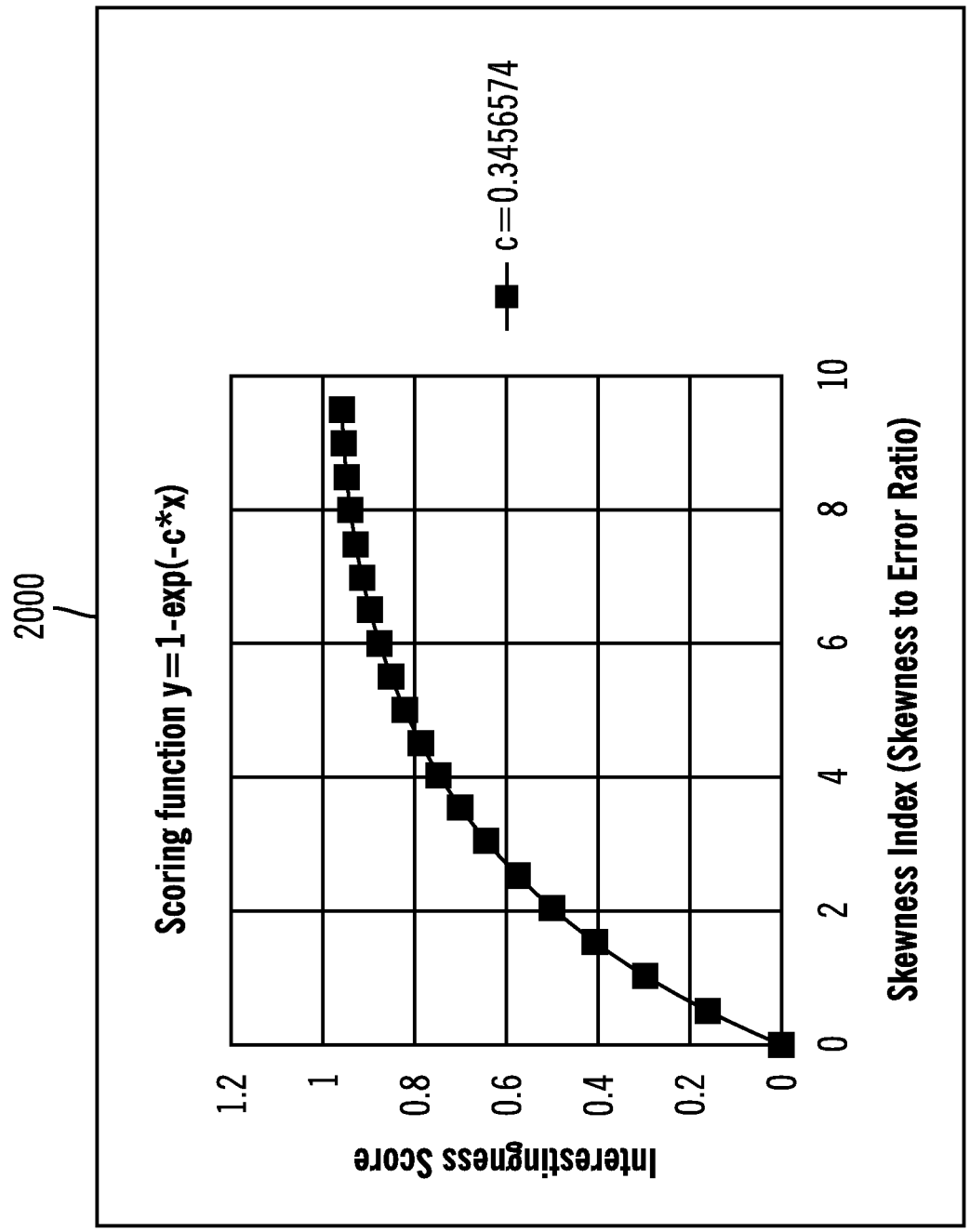
FIG. 20 illustrates an example graph for a scoring function for a skewness aspect in accordance with certain embodiments.

FIG. 20 illustrates an example graph 2000 for a scoring function for a skewness aspect in accordance with certain embodiments. Many experts consider a field being significantly skewed when the Skewness to Error Ratio exceeds 2. This threshold is mapped by the scoring function to 0.5 in the interestingness score domain.

Figure 21:
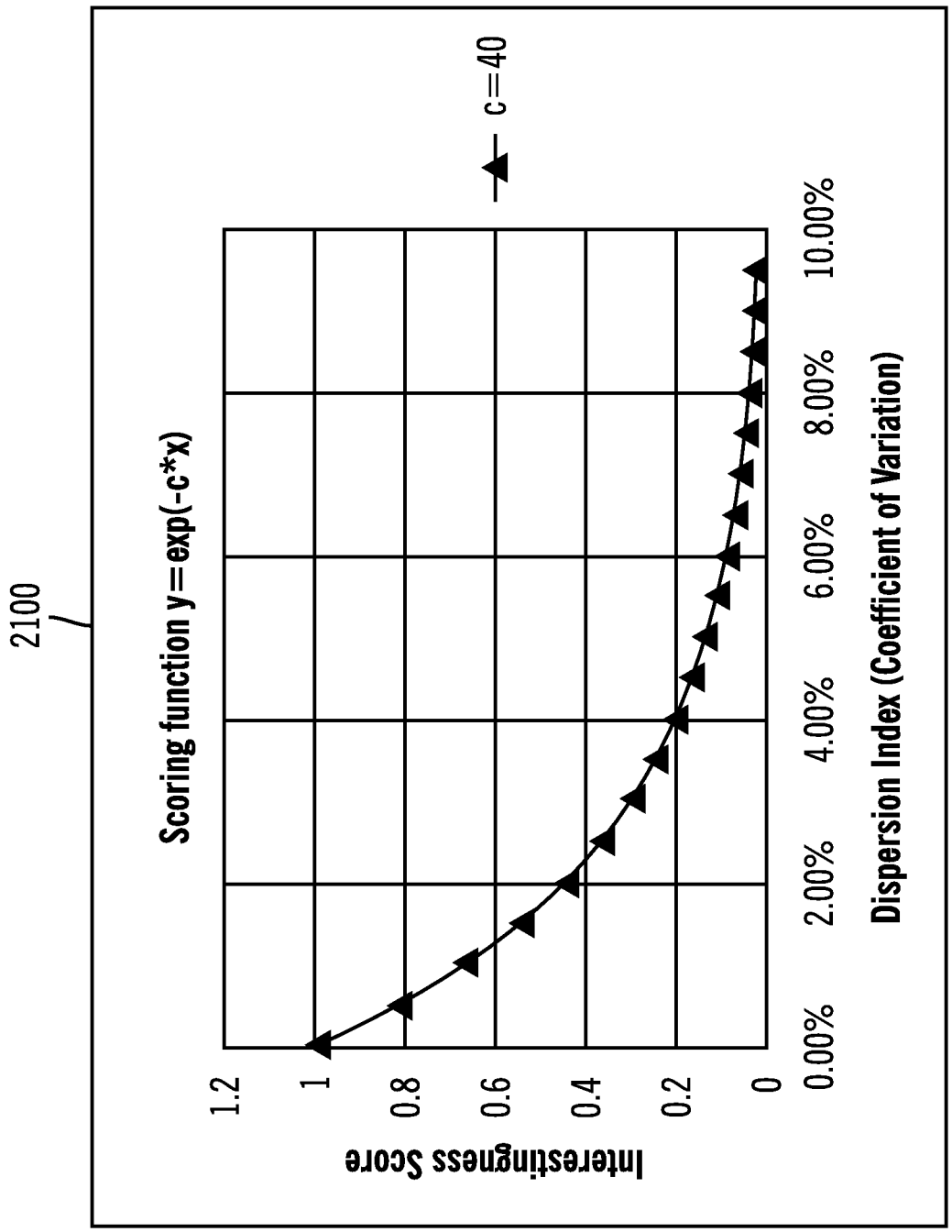
FIG. 21 illustrates an example graph for a scoring function for a coefficient of variation aspect in accordance with certain embodiments.

FIG. 21 illustrates an example graph 2100 for a scoring function for a dispersion (coefficient of variation) aspect in accordance with certain embodiments. A field is regarded as a "constant variable" when its Coefficient of Variation (CV) approaches 0. CV has not been specified as a sub-index in the table of indexes 600, 610, 620. Nevertheless, CV may be used for positive ratio fields and also serves as an example of how the list of sub-indexes may be extended.

Figure 22:
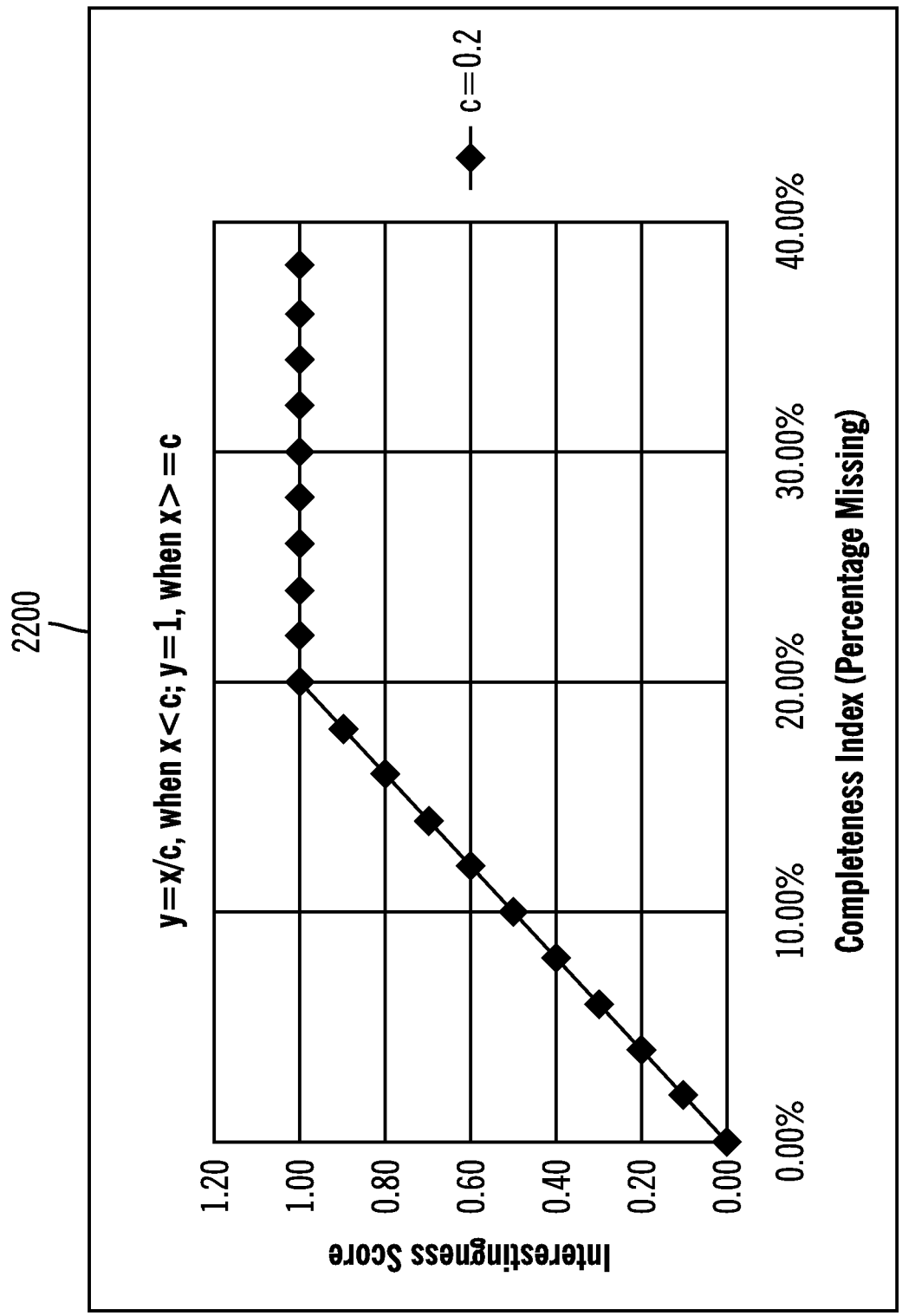
FIG. 22 illustrates an example graph for a scoring function for a completeness aspect in accordance with certain embodiments.

FIG. 22 illustrates an example graph 2200 for a scoring function for a completeness aspect in accordance with certain embodiments. A field may be recommended to be discarded when the percentage of missing values exceeds a certain threshold (e.g., 20%).

The example graphs 2000, 2100, and 2200 show a connection between the expert insights 170 and expert recommendations 172 of actions in the field profile section and the scoring functions. The example graphs 2000, 2100, and 2200 illustrate how the thresholds that trigger expert insights 170 or expert recommendations 172 of actions in the field profile section are related to the parameters of the scoring functions.

In various embodiments, the combination function $f(\cdot)$ may take different forms that each satisfy the following requirements:

1) the combination function aggregates the interestingness scores, and
2) the resulting GII, ranging from 0 to 1, reflects the degree of overall interestingness.

In certain embodiments, a possible embodiment of the combination function is the weighted sum:

$$f(x_1, \ldots, x_n) = \sum_{i=1}^{n} w_i x_i$$

where $\sum_{i=1}^{n} w_i = 1$, and $w_i \geq 0$

Figure 23A:
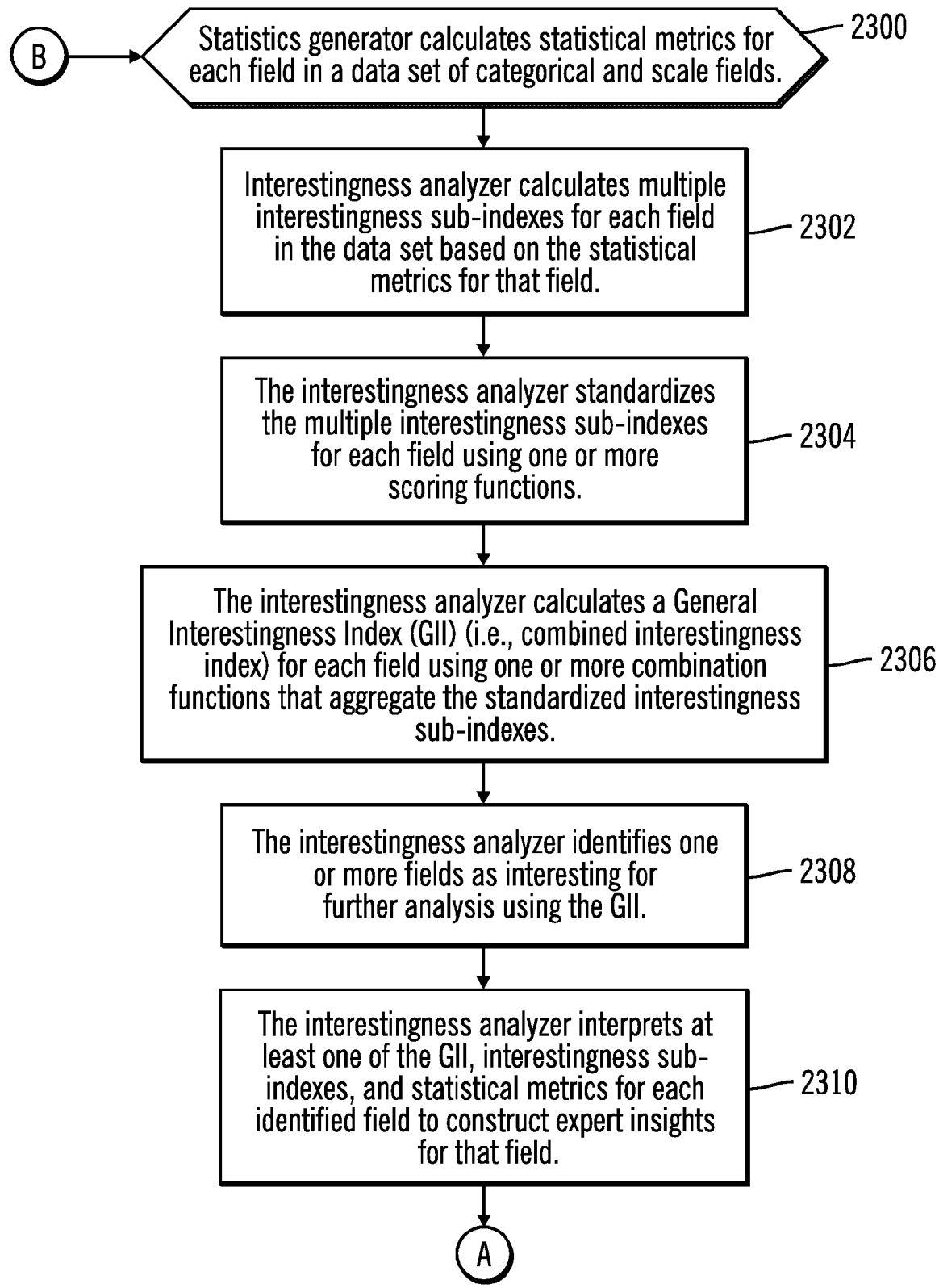
FIGS. 23A and 23B illustrate logic, in a flow diagram performed by an interestingness analyzer to recommend and process field transformations in accordance with certain embodiments.
Figure 23B:
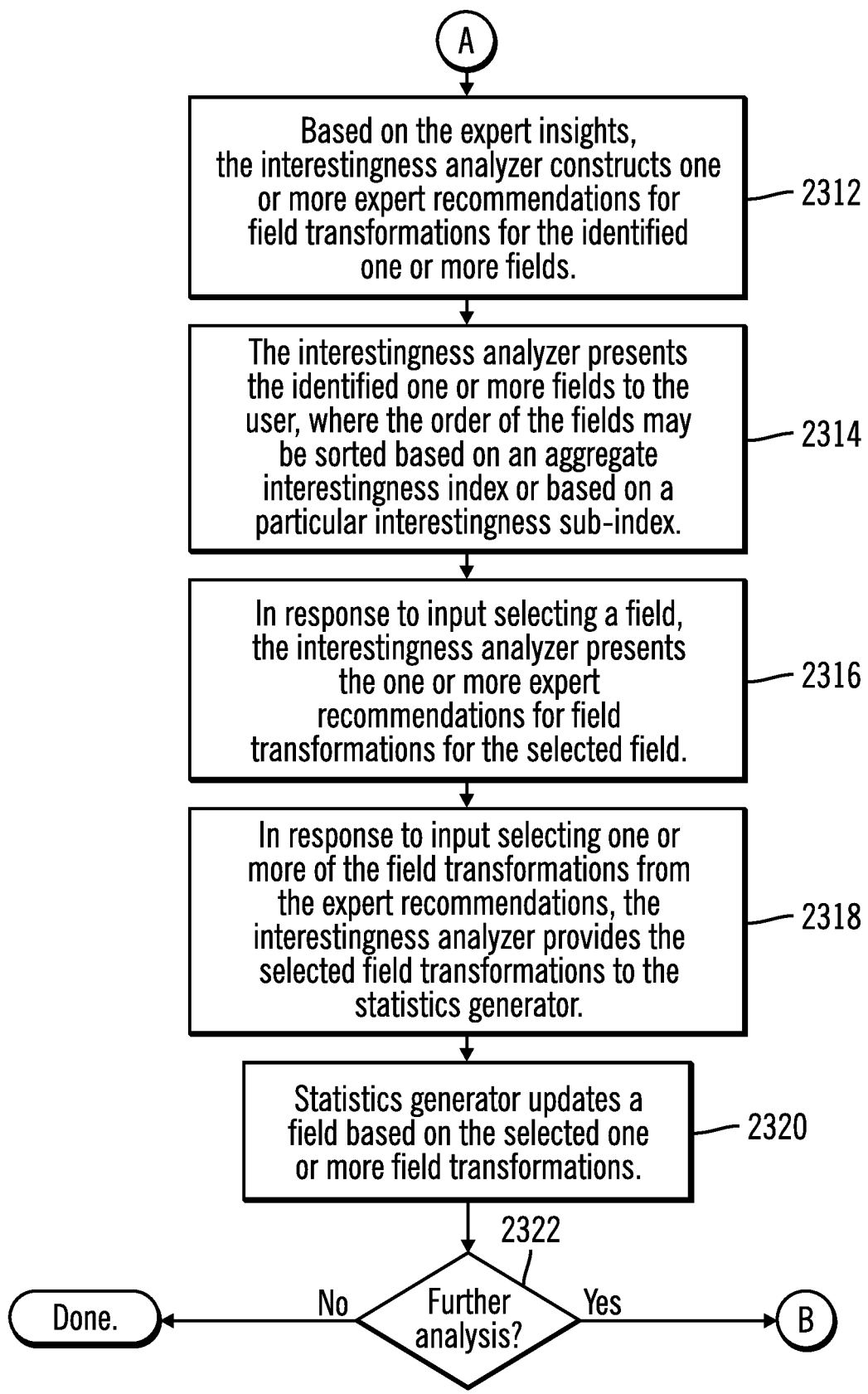

FIGS. 23A and 23B illustrate logic, in a flow diagram performed by an interestingness analyzer 110 to recommend and process field transformations in accordance with certain embodiments. Control begins at block 2300 with the statistics generator 120 calculating statistical metrics 162 for each field in a data set of categorical and scale fields. In certain embodiments, the statistical metrics 162 are the statistics 300, 400 shown in FIGS. 3 and 4 (e.g., mode, media, etc.). In block 2302, the interestingness analyzer 110 calculates multiple interestingness sub-indexes 164 (also referred to as interestingness metrics) for each field in the data set based on the statistical metrics 162 for that field. In block 2304, the interestingness analyzer 110 standardizes the multiple interestingness sub-indexes for each field using one or more scoring functions. In block 2306, the interestingness analyzer 110 calculates a General Interestingness Index (GII) 164 (i.e., a combined interestingness index) for each field using one or more combination functions that aggregate the standardized interestingness sub-indexes 164. In block 2308, the interestingness analyzer 110 identifies one or more fields as interesting for further analysis using the GII 164. In block 2310, the interestingness analyzer 110 interprets at least one of the GII, interestingness sub-indexes, and statistical metrics for each identified field to construct expert insights 170 for that field. From block 2310 (FIG. 23A), processing continues to block 2312 (FIG. 23B). In block 2312, based on the expert insights 170, the interestingness analyzer 110 constructs one or more expert recommendations for field transformations for the identified one or more fields, where the transformation is used to process the data 160 to provide a better data set for further statistical analysis. In block 2314, the interestingness analyzer 110 presents the identified one or more fields (e.g., to a user or for selection by an application), where the order of the identified one or more fields may be sorted based on an aggregated interestingness index or based on a particular interestingness sub-index. That is, fields can be filtered and sorted in various ways bases upon the interestingness sub-indexes or an aggregated interestingness index. In block 2316, in response to input selecting a field, the interestingness analyzer 110 presents the one or more expert recommendations for field transformations for the selected field (e.g., to a user or for selection by an application). In certain embodiments, in block 2316, the interestingness analyzer 110 also presents the statistical metrics, interestingness sub-indexes, GII, and/or expert insights 170. In block 2318, in response to input selecting one or more of the field transformations from the expert recommendations 172, the interestingness analyzer 110 provides the selected field transformations to the statistics generator 120. In block 2320, the statistics generator 120 updates the field in the data 160 based on the selected one or more field transformations. In block 2322, the interestingness analyzer 110 determines whether further analysis is desired. If so, processing loops back to block 2300 to perform additional analysis with the updated data 160, otherwise, processing is done. In certain embodiments, the processing of the interestingness analyzer 110 is automatic, without user intervention, and, in such embodiments, the analysis may be completed after a certain number of iterations. In certain embodiments, a user may terminate the loop by indicating that further analysis is not desired.

In certain embodiments, the interestingness analyzer 110 receives as input a set of univariate statistics, the characterization of field interestingness and indexes available for different measurement levels, field interestingness indexes 164, individual field profiles 166, and individual field profile templates 168 for a scale field and a categorical field. The interestingness analyzer 110 generates expert insights 170 and expert recommendations 172 on a completeness aspect for both scaled and categorical fields, expert insights 170 and expert recommendations 172 on a central tendency aspect for a scale field, expert insights 170 and expert recommendations 172 on a dispersion aspect for a scale field, expert insights 170 and expert recommendations 172 on outlier aspect for a scale field, expert insights 170 and expert recommendations 172 on a distribution shape aspect for a scale field, expert insights 170 and expert recommendations 172 on a data glitch aspect for a scale field, expert insights 170 and expert recommendations 172 on imbalance aspects for a categorical field, expert insights 170 and expert recommendations 172 on a range aspect for an ordinal field. The interestingness analyzer 110 also provides field sorting according to percentage of special values.

In certain embodiments, the interestingness analyzer 110 characterizes field interestingness to provide new indexes for field interestingness based on the values of summary statistics and analysis, allowing users to focus on the most interesting fields. The interestingness analyzer 110 derives expert insights 170 and provides data interpretation from the computed summaries based on the expert knowledge, suggests field transformation rules in order to prepare the data for further analysis, provides expert views on the summaries and analytics computed by a statistics generator 120 (i.e., a statistical or data mining computation engine), defines aspects of interestingness, organizes information accordingly for a comprehensive overview, advises on transformation rules for informed decisions on executing appropriate transformations, controls both the underlying statistics generator 120 and receives the user's interactive responses to interpret the analytic results and facilitate further data analysis, and implements analysis in a form of rules that easily translate into worded expert insights 170 for the users.

The interestingness analyzer 110 considers statistical measures and their interpretation and interestingness as applicable to the available data features. The interestingness analyzer 110 rates statistical properties of each field. The interestingness analyzer 110 evaluates "interestingness" from multiple statistical aspects for a field, such as skewness, outliers, distribution shape (i.e., asymmetry or peakness) and special values (i.e., missing values, outliers, and data glitches).

The interestingness analyzer 110 defines interestingness scores as generic measures for data interpretation and exploration. The interestingness analyzer 110 gives high interestingness scores to unusual fields that users may pay attention to.

In certain embodiments, the interestingness analyzer 110 uses interestingness measures that are generic and domain independent and that are not related with a predicted variable either.

The interestingness analyzer 110 analyzes statistical properties of a given field. The interestingness analyzer 110 considers evaluation and interpretation for fields and defines new interestingness measures that are useful for targeting fields of most interest.

Thus, the interestingness analyzer 110 solves users' questions by conducting interestingness evaluation in an organized and comprehensive way. The interestingness analyzer 110 characterizes field interestingness, provides a General Interestingness Index (GII) 500 including indexes 510, 520 for field interestingness based on the values of summary statistics and analyses. This allows users to focus on the most interesting fields, even when the data contains a large number of fields.

The interestingness analyzer 110 derives expert insights 170 and provides data interpretation from computed summaries based on the expert knowledge. The interestingness analyzer 110 recommends transformation rules in order to prepare the data for further analysis.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

The interestingness analyzer 110, statistics generator 120, and/or the field review application 130 may be implemented as hardware (e.g., hardware logic or circuitry), software, or a combination of hardware and software.

Figure 24:
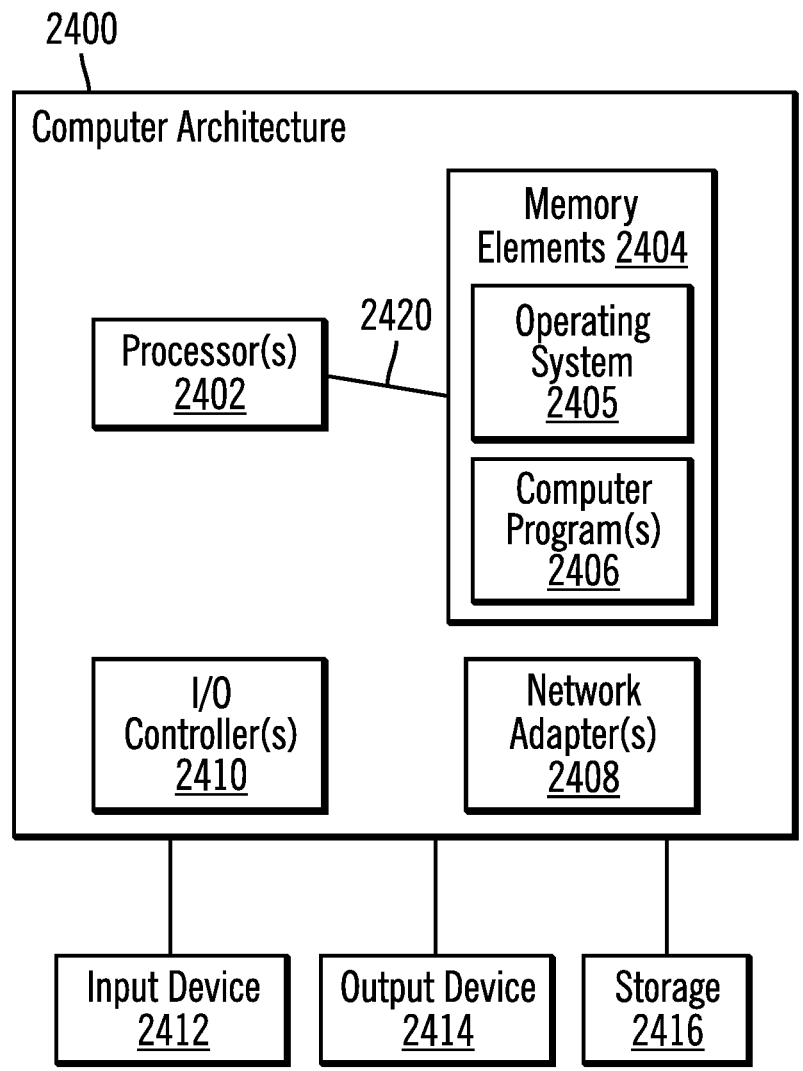
FIG. 24 illustrates, in a block diagram, a computer architecture that may be used in accordance with certain embodiments.

FIG. 24 illustrates a computer architecture 2400 that may be used in accordance with certain embodiments. Computing device 100 may implement computer architecture 2400. The computer architecture 2400 is suitable for storing and/or executing program code and includes at least one processor 2402 coupled directly or indirectly to memory elements 2404 through a system bus 2420. The memory elements 2404 may include local memory employed during actual execution of the program code, bulk storage, and cache memories which provide temporary storage of at least some program code in order to reduce the number of times code must be retrieved from bulk storage during execution. The memory elements 2404 include an operating system 2405 and one or more computer programs 2406.

Input/Output (I/O) devices 2412, 2414 (including but not limited to keyboards, displays, pointing devices, etc.) may be coupled to the system either directly or through intervening I/O controllers 2410.

Network adapters 2408 may also be coupled to the system to enable the data processing system to become coupled to other data processing systems or remote printers or storage devices through intervening private or public networks. Modems, cable modem and Ethernet cards are just a few of the currently available types of network adapters 2408.

The computer architecture 2400 may be coupled to storage 2416 (e.g., a non-volatile storage area, such as magnetic disk drives, optical disk drives, a tape drive, etc.). The storage 2416 may comprise an internal storage device or an attached or network accessible storage. Computer programs 2406 in storage 2416 may be loaded into the memory elements 2404 and executed by a processor 2402 in a manner known in the art.

The computer architecture 2400 may include fewer components than illustrated, additional components not illustrated herein, or some combination of the components illustrated and additional components. The computer architecture 2400 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A system for analyzing fields, comprising:
a processor; and
storage coupled to the processor, wherein the storage stores a computer program, and wherein the processor executes the computer program to operations, the operations comprising:
receiving statistical metrics for each field in a data set;
generating a general interestingness index for each field using one or more combination functions that aggregate standardized interestingness sub-indexes;
identifying one or more fields as interesting for further analysis using the general interestingness index;
constructing one or more expert recommendations for field transformations for the identified one or more fields, wherein the expert recommendations for field transformations indicate how the identified one or more fields in the data set should be updated; and
updating the identified one or more fields in the data set based on the field transformations.

2. The system of claim 1, wherein the general interestingness index comprises an interestingness index for nominal and ordinal fields and an interestingness index for interval and ratio fields.

3. The system of claim 1, wherein the operations further comprise:
calculating the statistical metrics for each field in the data set, wherein the statistical metrics comprise statistics for categorical fields and scale fields.

4. The system of claim 1, wherein the operations further comprise:
calculating multiple interestingness sub-indexes for each field in the data set based on the statistical metrics for that field.

5. The system of claim 4, wherein the operations further comprise:
standardizing the multiple interestingness sub-indexes for each field using one or more scoring functions.

6. The system of claim 1, wherein the operations further comprise:
interpreting at least one of the general interestingness index, the interestingness sub-indexes, and the statistical metrics for each field to construct expert insights for each field.

7. The system of claim 1, wherein the operations further comprise:
presenting the identified one or more fields;
in response to input selecting a field, presenting one or more expert recommendations for field transformations for the selected field; and
receiving input selecting one or more of the field transformations from the expert recommendations, wherein the selected field is updated with the selected one or more field transformations.

8. The system of claim 7, wherein the operations further comprise:
performing additional analysis on the updated field.

9. A computer program product for analyzing fields, the computer program product comprising:
a computer readable storage medium having computer readable program code embodied therewith, wherein the computer readable program code, when executed by a processor of a computer, is configured to perform:
receiving statistical metrics for each field in a data set;
generating a general interestingness index for each field using one or more combination functions that aggregate standardized interestingness sub-indexes;
identifying one or more fields as interesting for further analysis using the general interestingness index;
constructing one or more expert recommendations for field transformations for the identified one or more fields, wherein the expert recommendations for field transformations indicate how the identified one or more fields in the data set should be updated; and
updating the identified one or more fields in the data set based on the field transformations.

10. The computer program product of claim 9, wherein the general interestingness index comprises an interestingness index for nominal and ordinal fields and an interestingness index for interval and ratio fields.

11. The computer program product of claim 9, the computer readable program code, when executed by the processor of the computer, is configured to perform:
calculating the statistical metrics for each field in the data set, wherein the statistical metrics comprise statistics for categorical fields and scale fields.

12. The computer program product of claim 9, the computer readable program code, when executed by the processor of the computer, is configured to perform:
calculating multiple interestingness sub-indexes for each field in the data set based on the statistical metrics for that field.

13. The computer program product of claim 12, the computer readable program code, when executed by the processor of the computer, is configured to perform:
standardizing the multiple interestingness sub-indexes for each field using one or more scoring functions.

14. The computer program product of claim 9, the computer readable program code, when executed by the processor of the computer, is configured to perform:
interpreting at least one of the general interestingness index, the interestingness sub-indexes, and the statistical metrics for each field to construct expert insights for each field.

15. The computer program product of claim 9, the computer readable program code, when executed by the processor of the computer, is configured to perform:
presenting the identified one or more fields;
in response to input selecting a field, presenting one or more expert recommendations for field transformations for the selected field; and
receiving input selecting one or more of the field transformations from the expert recommendations, wherein the selected field is updated with the selected one or more field transformations.

16. The computer program product of claim 15, the computer readable program code, when executed by the processor of the computer, is configured to perform:
performing additional analysis on the updated field.

* * * * *